United States Patent
Langenberg et al.

(10) Patent No.: US 10,316,568 B2
(45) Date of Patent: Jun. 11, 2019

(54) POWER BOOST MODULE FOR A DOOR CLOSER

(71) Applicant: Schlage Lock Company LLC, Carmel, IN (US)

(72) Inventors: Daniel Langenberg, Zionsville, IN (US); Brian C. Eickhoff, Danville, IN (US); Aaron P. McKibben, Fishers, IN (US)

(73) Assignee: Schlage Lock Company LLC, Carmel, IN (US)

( * ) Notice: Subject to any disclaimer, the term of this patent is extended or adjusted under 35 U.S.C. 154(b) by 117 days.

(21) Appl. No.: 15/371,799

(22) Filed: Dec. 7, 2016

(65) Prior Publication Data
US 2017/0159344 A1 Jun. 8, 2017

Related U.S. Application Data

(60) Provisional application No. 62/264,055, filed on Dec. 7, 2015.

(51) Int. Cl.
*E05F 15/611* (2015.01)
*H02J 7/14* (2006.01)
(Continued)

(52) U.S. Cl.
CPC ............ *E05F 15/611* (2015.01); *E05F 3/22* (2013.01); *E05F 3/224* (2013.01); *E05F 15/63* (2015.01);
(Continued)

(58) Field of Classification Search
CPC ........ E05Y 2201/412; E05Y 2900/132; E05Y 2400/616; E05F 15/63; E05F 15/60; E05F 15/614
See application file for complete search history.

(56) References Cited

U.S. PATENT DOCUMENTS 4,973,894 A * 11/1990 Johansson ............. E05F 1/1016
318/266
5,193,647 A * 3/1993 O'Brien, II ............. E05F 1/105
16/49
(Continued)

FOREIGN PATENT DOCUMENTS

WO 2014152907 A 9/2014

OTHER PUBLICATIONS

International Preliminary Report on Patentability; International Searching Authority; International Patent Application No. PCT/US2016/065312; dated Jun. 12, 2018; 7 pages.
(Continued)

*Primary Examiner* — Justin B Rephann
(74) *Attorney, Agent, or Firm* — Taft Stettinius & Hollister LLP

(57) ABSTRACT

An apparatus according to one embodiment includes a door closer having a pinion adapted to be operably coupled to a door and rotate in a first direction in response to opening the door and to rotate in a second direction in response to closing the door, and a power boost module operably coupled to the pinion. The power boost module includes a motor adapted to generate electrical energy via rotational movement of the pinion and supply a boost force to the pinion to assist closing the door, a gearing operably coupled to the pinion and the motor and structured to back drive the motor to generate the electrical energy in response to rotation of the pinion, and an energy storage device adapted to store the electrical energy generated by the motor and supply stored electrical energy to the motor for the boost force.

17 Claims, 20 Drawing Sheets

(51) Int. Cl.
    *H02K 7/116*    (2006.01)
    *H02K 7/18*    (2006.01)
    *E05F 15/63*    (2015.01)
    *E05F 3/22*    (2006.01)
    *H02K 21/12*    (2006.01)
    *H02K 11/215*    (2016.01)

(52) U.S. Cl.
    CPC .............. *H02J 7/14* (2013.01); *H02K 7/116* (2013.01); *H02K 7/1853* (2013.01); *H02K 11/215* (2016.01); *H02K 21/12* (2013.01); *E05Y 2400/61* (2013.01); *E05Y 2400/616* (2013.01); *E05Y 2900/132* (2013.01)

(56) References Cited

U.S. PATENT DOCUMENTS

| | | | | |
|---|---|---|---|---|
| 5,243,735 A * | 9/1993 | O'Brien, II | ............ | E05F 3/104 16/49 |
| 5,386,885 A * | 2/1995 | Bunzl | ............ | E05F 1/105 16/49 |
| 5,913,763 A * | 6/1999 | Beran | ............ | E05F 15/70 49/26 |
| 6,061,964 A * | 5/2000 | Arnell | ............ | E05F 15/63 49/358 |
| 6,553,717 B2 * | 4/2003 | St. John | ............ | E05F 15/603 192/69.8 |
| 8,225,458 B1 | 7/2012 | Hoffberg | | |
| 8,359,790 B2 | 1/2013 | Shin | | |
| 8,547,046 B2 | 10/2013 | Burris et al. | | |
| 8,564,235 B2 | 10/2013 | Burris et al. | | |
| 8,779,713 B2 | 7/2014 | Burris et al. | | |
| 8,793,838 B2 | 8/2014 | McKibben et al. | | |
| 8,938,912 B2 | 1/2015 | McKibben et al. | | |
| 9,869,117 B2 * | 1/2018 | Houser | ............ | E05F 15/611 |
| 2006/0244271 A1 * | 11/2006 | Hass | ............ | E05F 15/63 292/336.3 |
| 2007/0268132 A1 * | 11/2007 | Milo | ............ | E05B 47/02 340/545.1 |
| 2009/0093913 A1 * | 4/2009 | Copeland, II | ............ | E05F 3/12 700/282 |
| 2010/0115853 A1 * | 5/2010 | Gebhart | ............ | H02P 6/085 49/506 |
| 2010/0242368 A1 * | 9/2010 | Yulkowski | ............ | E05F 15/50 49/349 |
| 2011/0257797 A1 | 10/2011 | Burris et al. | | |
| 2012/0029701 A1 * | 2/2012 | Houser | ............ | E05F 15/70 700/275 |
| 2012/0210540 A1 | 8/2012 | McKibben et al. | | |
| 2013/0239485 A1 * | 9/2013 | Reed | ............ | E05F 5/025 49/386 |
| 2013/0340343 A1 | 12/2013 | Dye et al. | | |
| 2014/0330436 A1 | 11/2014 | Copeland, II et al. | | |
| 2014/0346997 A1 | 11/2014 | Salutzki et al. | | |
| 2015/0135601 A1 | 5/2015 | McKibben et al. | | |
| 2015/0159988 A1 | 6/2015 | Essawy | | |

OTHER PUBLICATIONS

International Search Report; International Searching Authority; International Patent Application No. PCT/US2016/065312; dated Feb. 21, 2017; 2 pages.

International Written Opinion; International Searching Authority; International Patent Application No. PCT/US2016/065312; dated Feb. 21, 2017; 6 pages.

\* cited by examiner

POWER BOOST MODULE FOR A DOOR CLOSER

CROSS-REFERENCE TO RELATED APPLICATIONS

This application claims the benefit of U.S. Provisional Application Ser. No. 62/264,055 filed on Dec. 7, 2015, the contents of which are incorporated herein by reference in their entirety.

BACKGROUND

The present application generally relates to a door closer, and more particularly, but not exclusively, relates to a door closer that harvests energy which is subsequently used to boost terminal shutting of the door.

Doors may not fully close for a number of reasons. Many hydraulic door closers are set to meet the Americans with Disabilities Act ("ADA") requirement of 5 lbs. force to open the door. Due to this limited opening force, the amount of energy that can be stored in the hydraulic door closer is also limited. This may cause the door to have insufficient closing force to overcome adverse conditions such as pressure fluctuation due to operation of heating, ventilation, and air conditioning ("HVAC") systems, friction forces, poor condition of door hardware, weather stripping, etc. In these situations, the user must either increase the closer spring force (which may in turn cause the door to not meet the ADA requirement), leave the door in a possible non-secure state, or invest in a powered door closing device such as an auto operator. Therefore, a need exists for further technological developments in the area of door closers.

SUMMARY

According to one aspect, an apparatus is provided including a door closer and a power boost module. The door closer is adapted to be operably coupled to a door and may have a pinion adapted to rotate in a first direction in response to an opening of the door, and in a second direction, opposite the first direction, in response to a closing of the door. The power boost module may be operably coupled to the pinion and may include a motor adapted to generate electrical energy from rotational movement of the pinion and to supply a boost force to the pinion to assist closing of the door, a gearing operably coupled to the pinion and the motor and structured to back drive the motor to generate the electrical energy in response to rotation of the pinion, and an energy storage device adapted to store the electrical energy generated by the motor and supply stored electrical energy to the motor for the boost force.

According to another aspect, a power boost module is provided which is attachable to a door closer for supplying a boost force to assist in closing the door, and may include a motor adapted to generate electrical energy from rotational movement of a pinion of the door closer and to supply a boost force to the pinion to assist the closing of the door, a gearing operably coupled to the pinion and the motor and structured to back drive the motor to generate the electrical energy in response to rotation of the pinion, and an energy storage device adapted to store the electrical energy generated by the motor and supply stored electrical energy to the motor for the boost force.

According to yet another embodiment, a method is provided for retrofitting a door closer with a power boost module, and may include operably coupling a pinion of the door closer to a gearing of the power boost module while the door closer is attached to a door, wherein the gearing is positioned within a housing of the power boost module, the power boost module capable of harvesting energy and boosting terminal closing of the door using the harvested energy, and fastening the housing of the power boost module to the door closer.

Other embodiments include apparatuses, systems, devices, hardware, methods, and combinations for a door closer. This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE FIGURES

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DESCRIPTION OF ILLUSTRATIVE EMBODIMENTS

Figure 1:
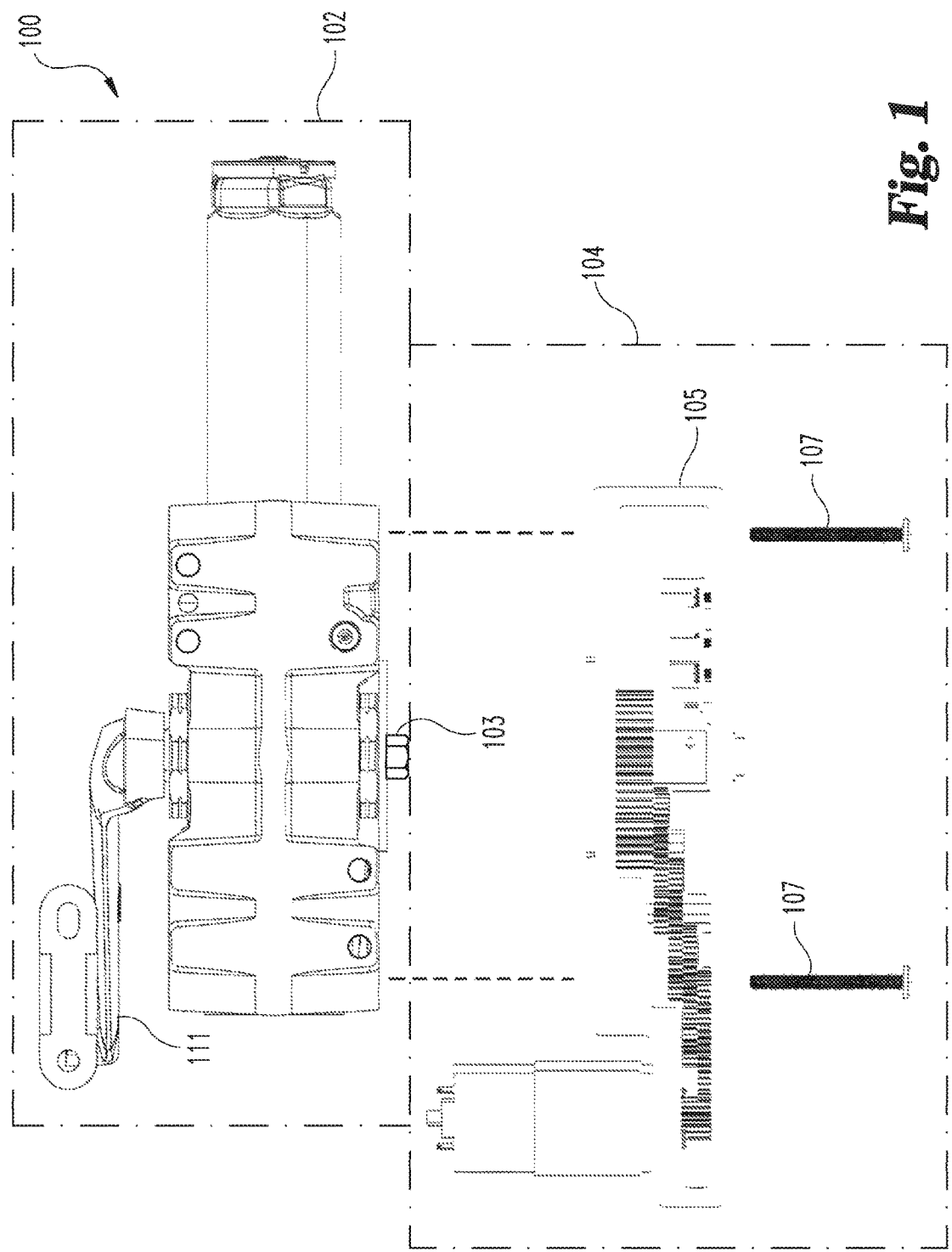
FIG. 1 is an exploded, partial cutaway front perspective view of at least one embodiment of a door closer system.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, need not be included or may be combined with other features.

Referring now to FIGS. 1-4, illustrated therein is at least one embodiment of a door closer system 100 which is structured and configured to harvest energy (e.g., by generating and storing the energy) via a person pushing on the door and/or via the closing force generated by a door closer, and subsequently using that harvested energy to boost the door shut (i.e., terminal shutting of the door). FIGS. 1-4 show various views of the door closer system 100 and/or the components/devices thereof. In particular, FIG. 1 illustrates an exploded, partial cutaway view of the door closer system 100. As shown, the door closer system 100 includes a door closer 102 and an electrical power boost assembly 104. In the illustrative embodiment, the door closer 102 is embodied as a hydraulic door closer 102. However, it should be appreciated that the door closer 102 may be embodied as another suitable type of closer in other embodiments. The power boost assembly 104 is configured to modularly attach to the door closer 102 and be positioned in powered or driving communication with the door closer 102 via a pinion 103 of the door closer 102. As such, in some embodiments, the power boost assembly 104 may be referred to herein as a power boost module 104.

Figure 2:
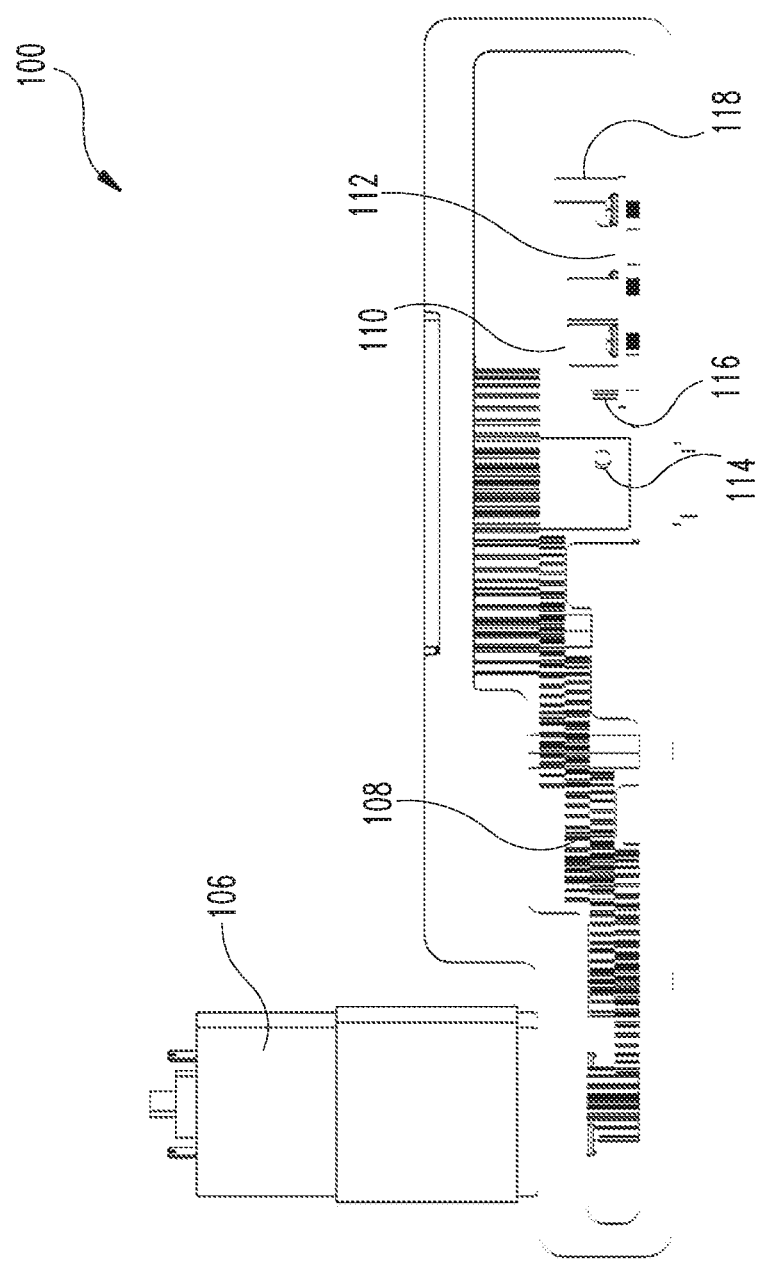
FIG. 2 is a cutaway front perspective view of at least one embodiment of a power boost assembly of FIG. 1.

FIG. 2 illustrates a perspective, cutaway view of the power boost assembly 104 of the door closer system 100. As shown, the illustrative power boost assembly 104 includes a motor 106, a gear train or gearing 108, an energy storage device 110 (e.g., one or more capacitor(s) or batteries), a printed circuit board assembly ("PCBA") 112, a magnet 114, a position sensor 116 (e.g., a Hall-effect sensor, a magnetometer, a reed switch, potentiometer, capacitive sensor, analog inductive sense, or other suitable position sensors), and/or discrete components 118 (e.g., adjust potentiometers, user interface, etc.). The PCBA 112 may include the hardware, firmware, and/or software (e.g., logic) for operating the power boost assembly 104. For example, the PCBA 112 may include a processing device (e.g., one or more microprocessors and/or microcontrollers) or electronic circuitry (e.g., analog and/or digital).

Figure 3:
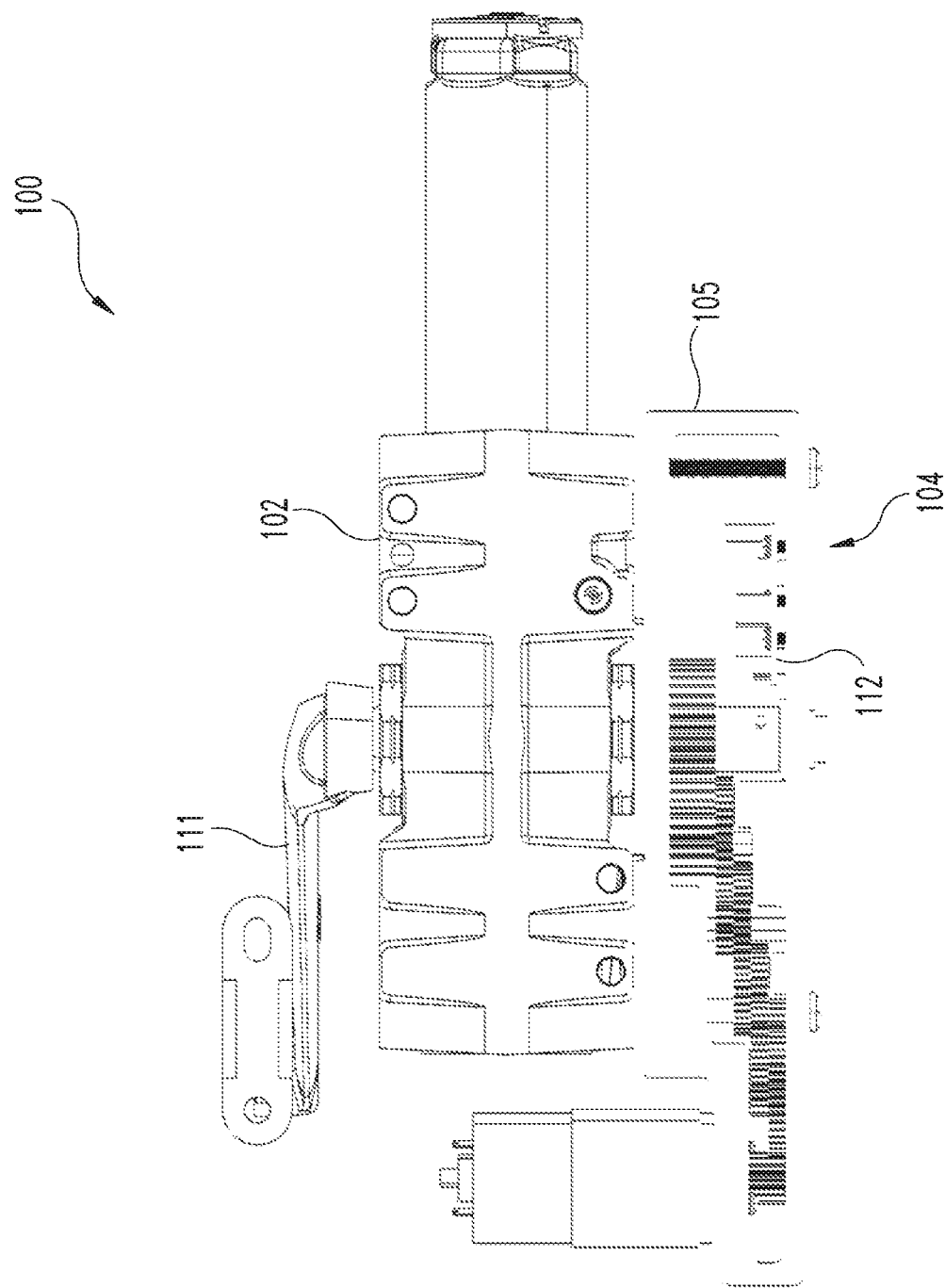
FIG. 3 is a front perspective view of the door closer system of FIG. 2.
Figure 4:
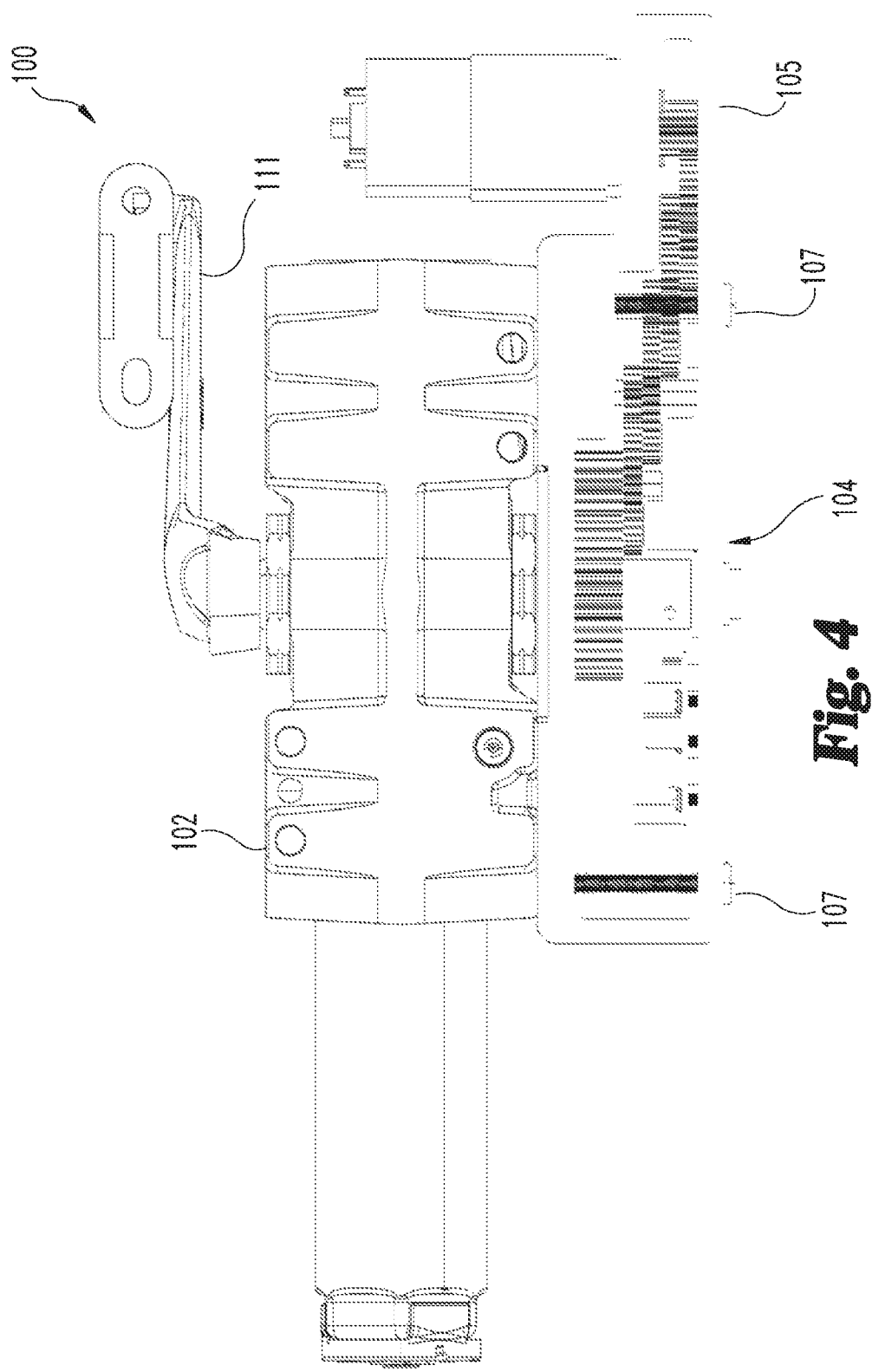
FIG. 4 is a rear perspective view of the door closer system of FIG. 2.

FIG. 3 illustrates a front view of the door closer system 100 in which the door closer 102 is coupled to the power boost assembly 104, and FIG. 4 illustrates a rear or back view of the door closer system 100 in which the door closer 102 is coupled to the power boost assembly 104.

The power boost assembly 104 may include a housing 105 that may be attached to the door closer 102. In particular, the power boost assembly 104 may be operably attached to the pinion 103 of the door closer 102. For example, the pinion 103 may be adapted to mate with a bore 109 defined in a gear of the gearing 108 of the power boost assembly 104. As such, it should be appreciated that, in some embodiments, the pinion 103 of the door closer 102 is exposed and positioned opposite the close arm(s) 111 such as, for example, an LCN 4040XP. Further, in some embodiments, the housing 105 of the power boost assembly 104 may also be secured to the door closer 102 via one or more fasteners 107 (e.g., threaded fasteners).

In the illustrative embodiment, by virtue of the connection with the pinion 103 of the door closer 102, the power boost assembly 104, in operation, receives rotational motion/torque as an input to drive the motor 106, and the motor 106 provides rotational motion/torque to the door closer 102 to boost the door shut in certain circumstances. That is, the motor 106 may be used to act as a generator during energy harvesting and to drive the door (not shown) while providing a power boost to fully close the door. As such, the pinion 103 rotates in one direction when the door is opened and the opposite direction when the door is closed. The gear train 108 is operably coupled between the motor 106 and the pinion 103, and it structured to increase the speed of the input from the pinion 103 to drive the motor 106 at a sufficient speed (RPM) to harvest energy, and to increase the boost power or potential boost force of the motor 106. As indicated above, the power boost assembly 104 may also include a PCBA 112 including the energy storage device, a user interface, a door position or landmark sensor, and/or a microcontroller. In some embodiments, the motor 106 is embodied as a DC brushless motor. In other embodiments, the motor 106 may be embodied as any type of motor suitable for performing the functions described herein (e.g., brushed motor, stepper motor, etc.).

In some embodiments, the door closer 102 may be a non-handed door closer mounted to a door using a standard mounting template. The door closer 102 may be non-handed so as to include an exposed end of the door closer pinion to actuate the electrical boost mechanism. As indicated above, the power boost assembly 104 may be fastened to the door closer 102 via fasteners. For example, mounting screws may attach directly to threaded holes in the door closer 102 such as, for example, cover mounting screw holes. In some embodiments, an existing door closer 102 can be left on the door, and the power boost assembly 104 can be attached or bolted on in the field (i.e., with the door closer 102 still attached to the door). In other embodiments in which threaded holes are unavailable or otherwise unusable, a mounting plate may be used. The mounting plate could be mounted to the door, behind the door closer 102, or to the door closer 102 in some other fashion. The power boost assembly 104 can then be mounted to the mounting plate. In some embodiments, a mounting plate (not shown) is mounted between the door closer 102 and the power boost assembly 104, for example, to deal with variability in manufacturing tolerances. In such embodiments, the mounting plate may include an aperture defined therein to permit the operable connection between the pinion 103 and the gearing 108. In some embodiments, other mounting methods may be used to attach the power boost assembly 104 to the door. The door closer 102 may be mounted to the door frame via one or more closer arms 111.

Figure 7:
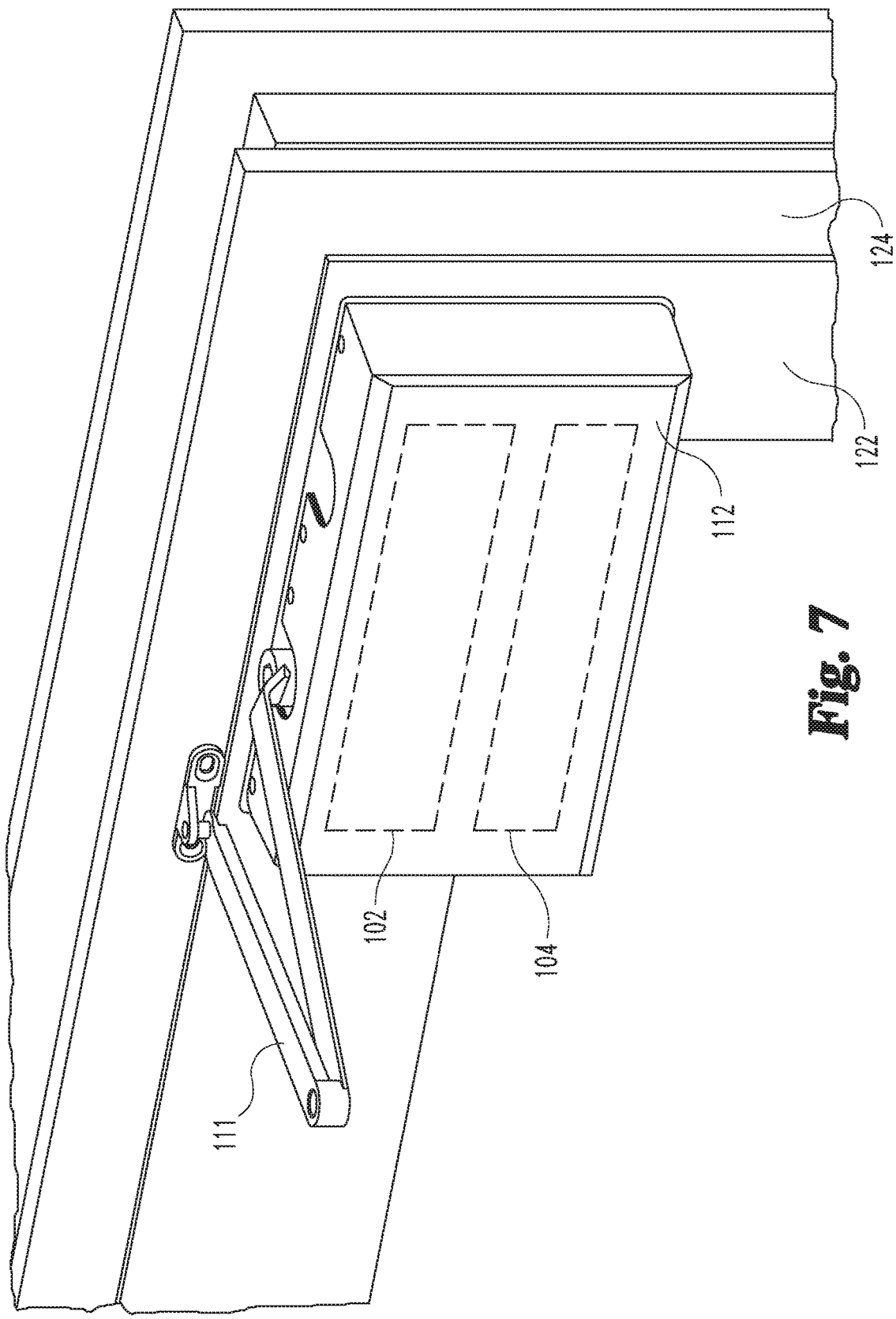
FIG. 7 is a front perspective view of a completed retrofit to an existing door closer with a power boost assembly.

As shown in FIG. 7, the door closer 102 and the power boost assembly 104 may be secured by a cover 120 after the power boost assembly 104 has been secured to the door closer 102. In some embodiments, it should be appreciated that the cover 120 may be fastened to the door closer 102 using the same fastening mechanism used to fasten a previous cover used to house only the door closer 102 (e.g., prior to the retrofit). As shown, the door closer system 100 is mounted to the door 122, and the closer arm(s) 111 secure the door closer 102 to the door frame 122.

As the door opens or closes, the door closer 102 may operate normally. As the pinion 103 rotates, the pinion 103 actuates the gearing 108 inside the power boost assembly 104. The gearing 108 is used to back drive the motor 106 to thereby generate electrical energy. The generated electrical energy is stored in an energy storage device 110 such as, for example, one or more capacitors (e.g., a supercapacitor or capacitor bank) or one or more batteries. It should be appreciated that the energy storage device 110 may be embodied as any one or more energy storage devices suitable for performing the functions described herein. For example, in some embodiments, the energy storage device 110 may include one or more capacitors, supercapacitors, Ultracapacitors, Electric Double Layer Capacitor (ELDC) devices, etc. In particular, the energy storage device 110 may be any type of capacitor characterized by high energy densities, low ESR, and low leakage performance. Depending on the particular embodiment, the power boost assembly 104 can be configured to harvest energy (e.g., by electrical and/or mechanical means) only on door opening, only on door closing, during both door opening/closing, or portions thereof. The motor 106 acts as a brake while harvesting such that the harvesting function can be used to control the door in the back-check zone and on door closing.

As the door closes, the door closer 102 may operate normally. Logic in the PCBA 112 may monitor the door angle, or may look for a landmark point and hold the stored electrical energy until the door angle reaches an appropriate angle where the door requires additional closing force or torque. To do so, the PCBA 112 may utilize sensor data generated by the sensor 116 (e.g., a hall-effect sensor) and the magnet 114. In other embodiments, the power boost assembly 104 may utilize other sensors and/or techniques to determine the door angle. The additional force/torque required to shut a particular door could be due to HVAC pressure fluctuations, door alignment/misalignment, weather stripping, latch forces, or other forces that hinder door closing. Regardless of the cause, in some embodiments, the electrical energy is used to power the motor 106 and provide a "power boost" to the door closer 102 to provide a higher than normal closing force (e.g., a boost force) to fully close/shut the door.

By continuously or periodically monitoring the door angle, the PCBA 112 can monitor door position and speed. If the door gets to an almost closed state (e.g., fifteen degrees from closed), but begins to abnormally slowdown, then a power boost may be initiated. If the door is cycling correctly, no boost may be needed, and the harvested energy can be stored for a future boost cycle and/or to perform other functions or operations. In some embodiments, it should be appreciated that the PCBA 112 may only cause a power boost if the amount of energy stored in the energy storage device 110 exceeds a threshold amount of electrical energy necessary to boost the door to the closed position. That is, the power boost assembly 104 does not waste electrically energy by boosting the door toward the closed position if the boost force that can be accomplished using the stored electrical energy is insufficient to actually close the door. As such, unnecessary depletion of stored energy may be avoided. It should be appreciated that the threshold amount of electrical energy to boost the door may be predetermined, static or dynamic, determined based on sensor data, or otherwise determined based on the particular embodiment. Further, in some embodiment, the latch zone (e.g., between zero and fifteen degrees) at which the door is to the almost closed state may vary depending on the particular embodiment and, in some embodiments, may be modified by a user via a user interface of the power boost assembly 104.

Using a landmark point method, a specific pinion angle may be detected. To do so, the power boost assembly module 104 may utilize a snap switch, a reed switch, a Hall-effect sensor, or other suitable position sensors or switches. The landmark angle can be a designator when the door has reached the latch zone. When the door is in the latch zone, the PCBA 112 may provide a signal to boost the door closed on every cycle. The PCBA 112 may also look at motor voltage while harvesting to determine door speed and use the sensed door speed value to determine if a power boost is needed (e.g., boosting only if the door is moving slowly or is stopped). This allows the power boost assembly 104 to selectively provide a power boost, and to be able to store energy if a boost is not needed.

Door closers may be used in a variety of applications which can cause a relatively large variation of pinion travel. In some embodiments, this may require calibration or setup by the user. The landmark detection embodiment, however, may require no setup/calibration or minimal setup/calibration. This method may function similar to a mechanical closer wherein the latch zone corresponds to a set amount of pinion rotation. This method may require the installer to attach the unit to the closer pinion 103 in an orientation where the landmark sensor will be in the correct position while the door cycles. This may be accomplished by having marks on the pinion attachment that must be correctly orientated prior to installation.

Figure 5:
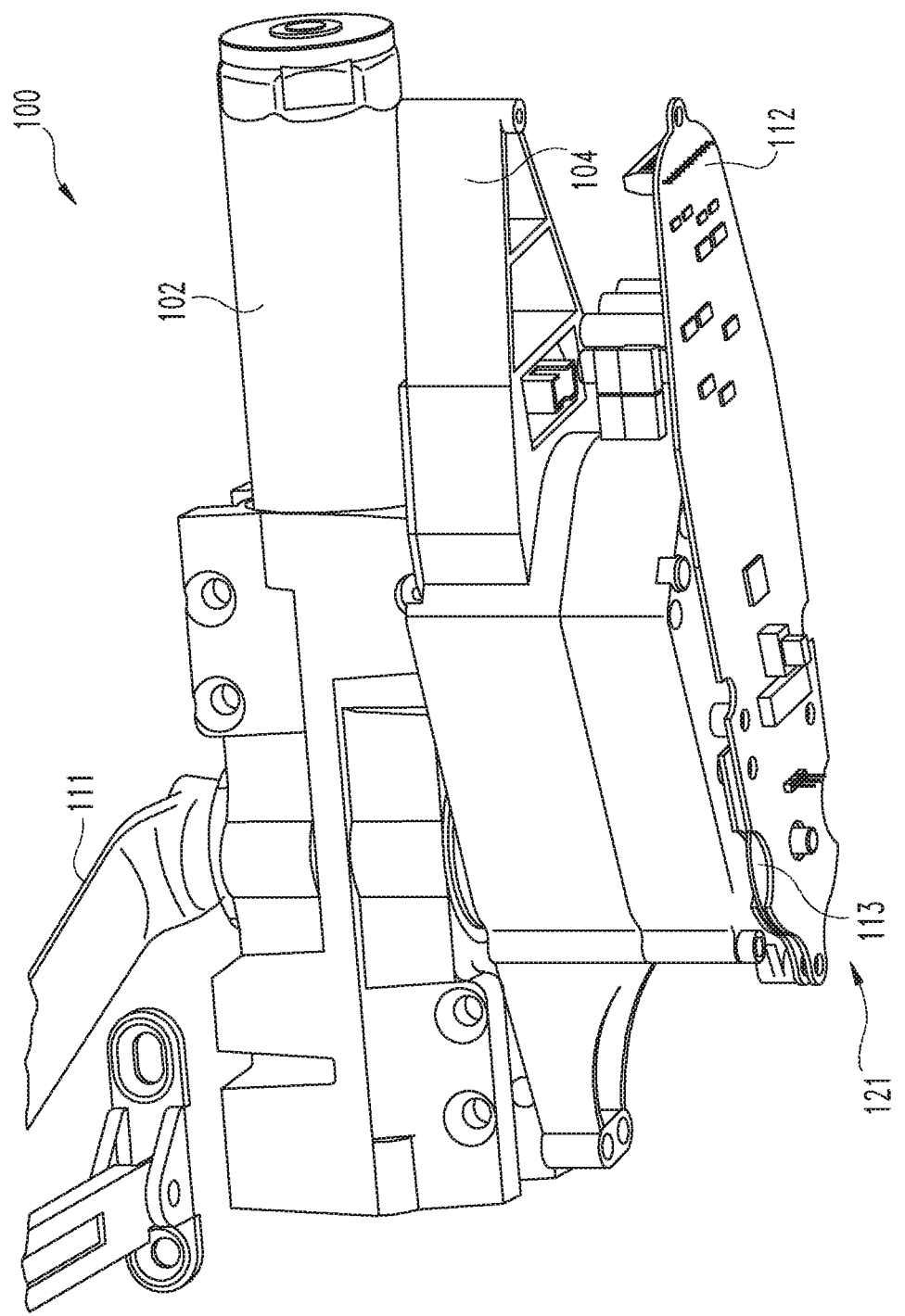
FIG. 5 is a front perspective view of at least one embodiment of another door closer system.
Figure 6:
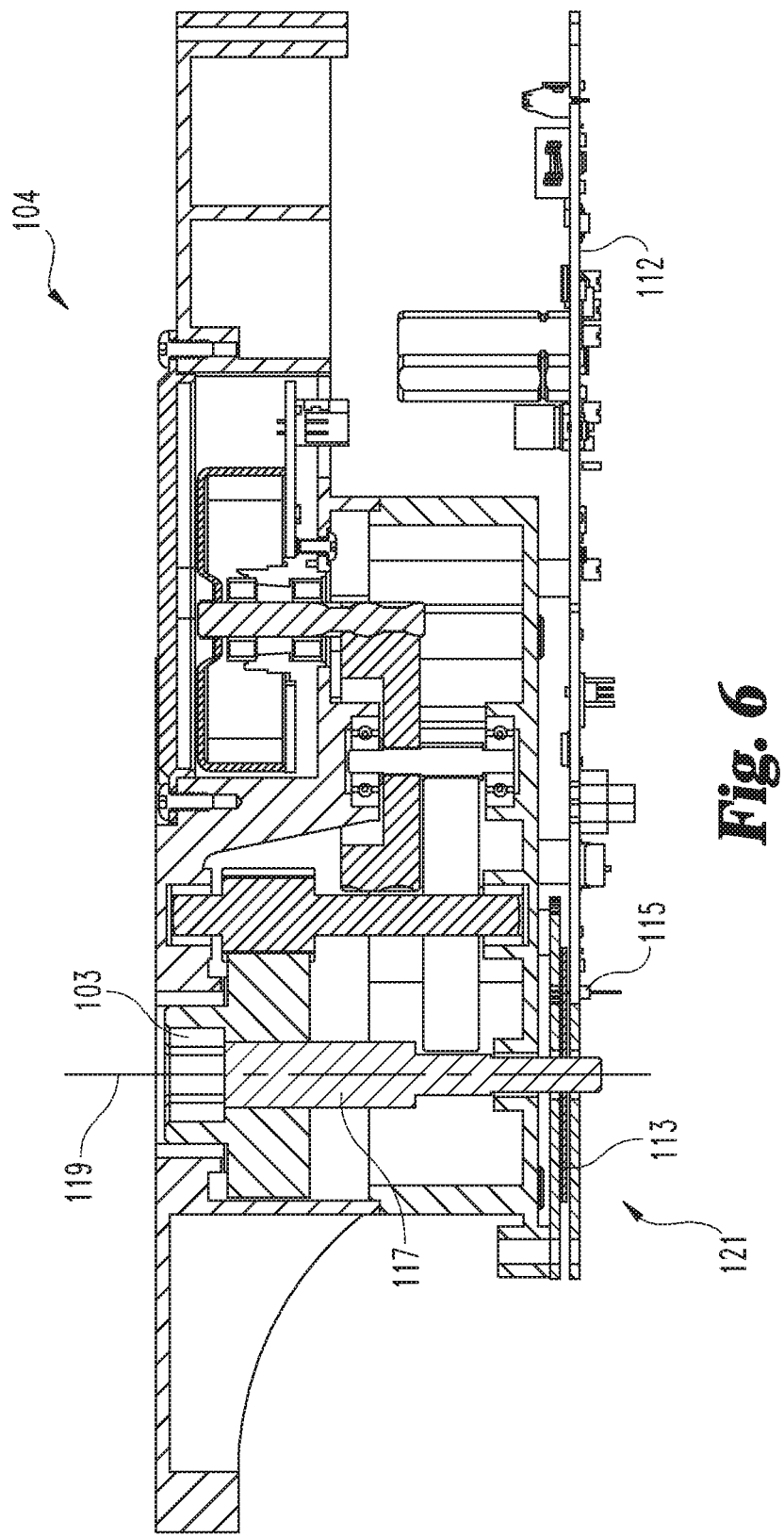
FIG. 6 is a cross-sectional view of a power boost assembly of the door closer system of FIG. 5.

Referring now to FIGS. 5-6, at least one other embodiment of a door closer system 100 that includes a landmark sensor 121 or landmark detection system for determining whether the door is within the latch zone. The door closer system 100 of FIGS. 5-6 may be configured similar to the door closer system 100 of FIGS. 1-4. However, the door closer system 100 includes a landmark sensor 121 that is provided with a target board 113 and an antenna 115. As shown, the target board 113 is secured to a rotor 117 of the motor 106 for rotation therewith (e.g., about an axis 119 shared with the pinion 103). The antenna 115 is secured to the PCBA 112, which may in turn be offset from the target board 113. Further the target board 113 includes a landmark point (e.g., a copper mark on the target board 113) that may be sensed by the antenna 115 when the landmark point crosses the antenna 115. The landmark sensor 121 may be used to detect when the door is within the latch zone, which may be modified by the user in some embodiments.

In another embodiment, a landmark position is not used. Instead, a speed detection algorithm may be used to regulate the power boost assembly 104 to a specific speed, harvesting when the door is moving too fast, and boosting when the door is moving too slow. This may accomplished by monitoring the back-EMF of the motor 106, and regulating the voltage within a specific voltage window.

In embodiments that continuously monitor pinion position, such as using a potentiometer or encoder, calibration may be needed to determine door position. This can be accomplished by having a procedure performed by the installer so that the unit correlates door position to the sensor readings. One method for accomplishing this feature includes having the user perform a calibration routine after installation involving pressing a button when the door is closed, then opening the door to 90 degrees, and then pressing the button again. Furthermore, additional steps involving pressing the button at the fully opened position, latch zone, or a power boost zone can be added to further define the door angles and refine operation. Other calibration techniques may be used in other embodiments.

The harvesting and braking functions can be performed automatically, or can be set up for manual adjustment by the user. For automatic operation, the power boost assembly 104 may be factory setup to perform at levels that will work for all applications. By adding user inputs (e.g., potentiometers, dip switches, and push buttons), energy harvesting by the power boost assembly 104 may be refined for a particular application. For example, in such embodiments, the braking function of the closer may be turned down, and the harvesting/braking of the power boost assembly 104 may be increased to allow more energy to be harvested for subsequent power boosting. This may add relatively significant energy, especially if the closer size is increased.

In some embodiments, the power boost function may also be user modified. For example, the power boost may be set at the factory at a safe level for all applications. Further, adjustments may also be made, in some embodiments, so that the installer can set the boost level in the field. Such features can be particularly useful for heavy or large doors where additional closing force may be required.

To maximize efficiency and reduce cost, gearbox tooth contact points (e.g., using smaller gears) may be minimized, which may in turn result in a weaker gearbox. In order to handle these abusive torques, multiple methods of torque reduction may be used including, for example, torque-limiting the motor/generator by using current-limits on the control circuitry, and/or by current limiting the power boost assembly 104, and/or having the user set the hydraulics to compensate for any lack of breaking done by the power boost assembly 104.

It should be understood that multiple techniques may be utilized for maximizing the harvested energy while reducing gear torques including, for example, constant current harvest (always attempt to harvest at a specific point), constant voltage harvest (harvest all energy above a specific voltage), constant resistance harvest (vary harvesting proportionally to the motor RPM), fixed-PWM with current limit (apply a fixed PWM to the motor H-bridge, and cutoff the PWM output when the current exceeds the predetermined torque value), and/or variable-PWM with current limit (apply a variable PWM to the motor H-bridge, and cutoff the PWM output when the current exceeds a predetermined torque value). A microcontroller may vary the duty cycle when required.

Energy storage may be accomplished via an energy storage device 110, thereby allowing for "infinite" cycling of the device without replacing the storage device or any electronics. In particular, organic electrolytic, double-layer capacitors may be used which can handle the relatively wide temperature range and relatively high capacitance demands of the system.

The power boost assembly 104 electrically harvests energy on door opening but, in some embodiments, a majority of the energy is being stored in a spring in the door closer 102. By storing the energy in the spring first, the power boost assembly 104 can control the speed at which the door closes, thereby allowing the power boost assembly 104 to tune the system for efficient energy storage.

An H-bridge driver may have a high enough voltage rating to handle the events, but devices down-stream need only handle voltages around the maximum capacitor storage voltage. By taking advantage of the winding resistance and winding inductance, this energy can be shunted into the energy storage device 110 rather to ground. If the energy storage device 110 is fully charged, then energy may be shunted into ground. By appropriately segmenting these methods, the proper amount of energy may be shunted without overrating the other devices.

The power boost assembly 104 may use a dynamic control scheme based on a set of rules that maximize efficiency while controlling movement of a door. The feedback system may be based on the input instead of the output.

As an external force starts to open the door, the spring in the door closer 102 compresses and the motor 106 starts rotating. The power boost assembly 104 may store all low-RPM energy in the spring. Once the motor back-EMF is high enough to start harvesting (as low as 3V turn-on), the power boost assembly 104 may or may not start harvesting a small amount of electrical energy. All other energy is generally stored in the spring.

When door movement experiences high speeds, the power boost assembly 104 may increase the energy harvesting amount. The power boost assembly 104 may limit the current harvested so that the power boost assembly 104 can reduce the torque or rotational force on the gearbox 108. As the motor 106 is harvesting energy, the motor 106 also acts as a brake to slow movement of the door.

As the door hits "backcheck", the power boost assembly 104 may maximize the energy harvested to slow down moment of the door. As the external force stops opening the door, the energy stored in the momentum of the door may be transferred into the spring and into the motor 106. When the door stops moving, all energy harvesting may stop, and the power boost assembly 104 may use the harvested/stored energy in the spring to start pushing the door closed.

Once the spring has inserted enough energy into the door, and the door's kinetic energy is sufficient for the user's application, the power boost assembly 104 starts siphoning the spring energy into electrochemical energy. If there is an abusive situation, the power boost assembly 104 may harvest some of that energy, and the other portion of the energy may or may not go into the hydraulics to be expended as heat.

If the spring is unable to insert enough energy into the door, or if the door kinetic energy drops sufficiently low, the power boost assembly 104 uses the stored reserve of the electrochemical energy through the motor 106, thereby controlling the current and/or voltage flowing through the motor 106 to control movement of the door.

If the power boost assembly 104 detects an abnormality during the closing, such as a human pushing on the door, the power boost assembly 104 may reduce the amount of boost the power boost assembly 104 provides, if any. If the power boost assembly 104 detects an abnormality or obstruction, such as a door frame, the power boost assembly 104 may increase the boost energy to place the door into its final/terminal closed position. Alternatively, the power boost assembly 104 may refrain from supplying the boost force as the obstruction may be an object propping the door.

Once the power boost assembly 104 is in its final position, the power boost assembly 104 may start the shutdown sequence, which may or may not include storage and/or communication of the door's statistics via Bluetooth to a mobile device or a gateway to a back-end device such as a server.

Since the power boost assembly 104 is operating at relatively low voltages, the power boost assembly 104 may be operating an H-bridge as an energy boost converter, which may allow the power boost assembly 104 to operate the system at relatively low RPMs, and the down-stream electronics may manage any high-voltage scenarios. The impedance of the capacitors and the motors may be adjusted to allow the system to behave as a synchronous or asynchronous boost converter, synchronous or asynchronous buck converter, or a pass-through charger, depending on the state/configuration of the system.

When boosting the door shut, the power boost assembly 104 typically will control the power entering the system. The microcontroller may regulate the power supply voltage rather than the power into the motor 106. This may decrease the efficiency losses in the system as well as stability problems related to having two switching supplies placed in series with one another.

Figure 8:
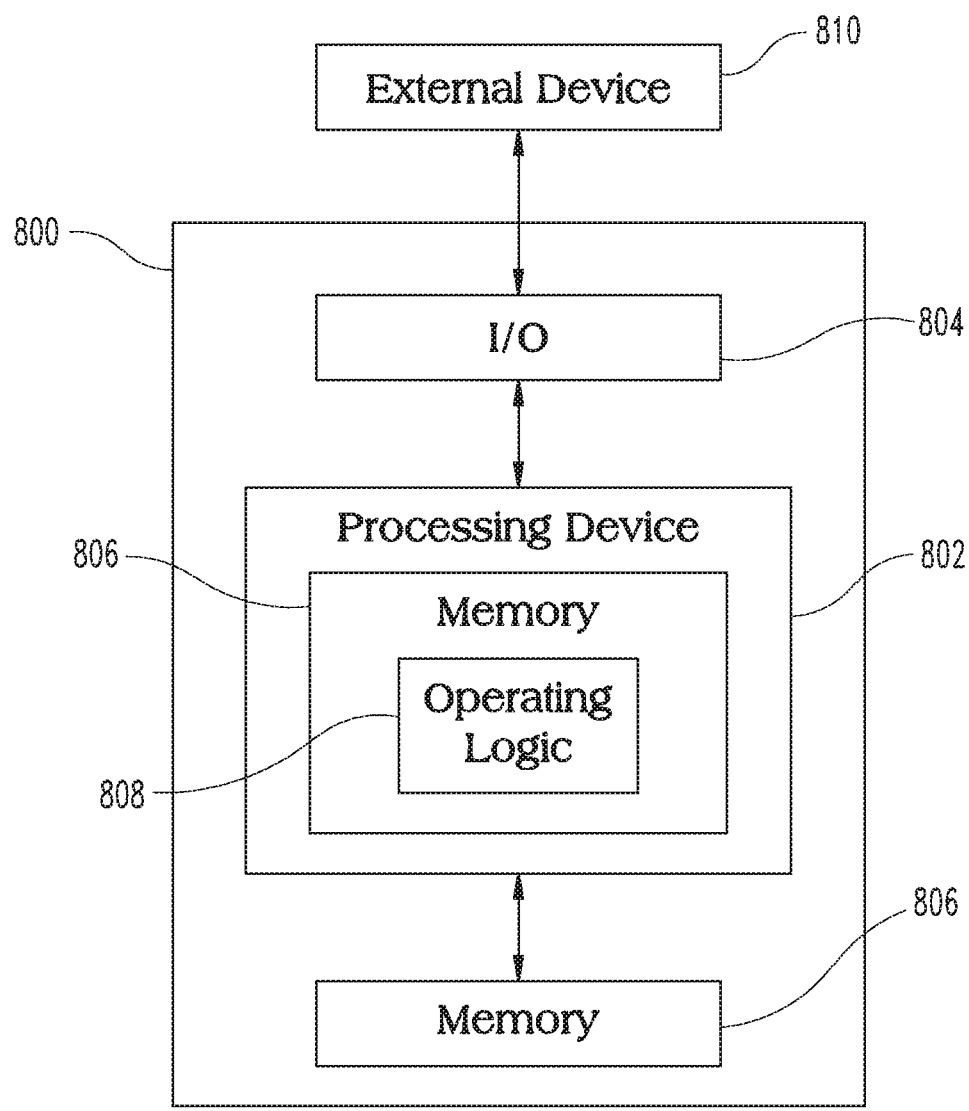
FIG. 8 is a simplified block diagram of at least one embodiment of an electronic controller associated with a power boost assembly.

Referring now to FIG. 8, a simplified block diagram of at least one embodiment of a control system 800 of the power boost assembly 104 is shown. As indicated above, it should be appreciated that the control system may include or be embodied as a PCBA device in some embodiments. The illustrative control system 800 includes a processing device 802 that executes algorithms and/or processes data in accordance with operating logic 808, an input/output device 804 that enables communication between the control system 800 and one or more external devices 810, and memory 806 which stores data. It should be appreciated that the control system 800 may include multiple input/output devices 804, memories 806, and/or operating logics 808 in some embodiments. Similarly, the control system 800 may be configured to communicate with multiple external devices 810 in some embodiments.

The input/output device 804 allows the control system 800 to communicate with the external device 810. For example, the input/output device 804 may include a transceiver (e.g., Bluetooth and/or Wi-Fi), a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, etc.) to effect such communication depending on the particular control system 800. Additionally, in some embodiments, the input/output device 804 may allow power transfer between the control system 800 and other devices (e.g., to power an electronic lock). The input/output device 804 may include hardware, software, and/or firmware suitable for performing the techniques described herein.

The external device 810 may be any type of device that allows data to be inputted or outputted from the control system 800. For example, in various embodiments, the external device 810 may be embodied as an access control device, server (e.g., in a cloud computing environment, desktop computer, laptop computer, tablet computer, notebook, netbook, Ultrabook™, mobile computing device, cellular phone, smartphone, wearable computing device, personal digital assistant, Internet of Things (IoT) device, processing system, router, switch, diagnostic tool, controller, printer, display, alarm, illuminated indicator (e.g., a status indicator), peripheral device (e.g., keyboard, mouse, touch screen display, etc.), and/or any other computing, processing, and/or communication device capable of performing the functions described herein. Furthermore, in some embodiments, it should be appreciated that the external device 810 may be integrated into the control system 800.

The processing device 802 may be embodied as any type of processor(s) capable of performing the functions described herein. In particular, the processing device 802 may be embodied as one or more single or multi-core processors, microcontrollers, or other processor or processing/controlling circuits. For example, in some embodiments, the processing device 802 may include or be embodied as an arithmetic logic unit (ALU), central processing unit (CPU), digital signal processor (DSP), and/or another suitable processor(s). The processing device 802 may be a programmable type, a dedicated hardwired state machine, or a combination thereof. Processing devices 802 with multiple processing units may utilize distributed, pipelined, and/or parallel processing in various embodiments. Further, the processing device 802 may be dedicated to performance of just the operations described herein, or may be utilized in one or more additional applications. In the illustrative embodiment, the processing device 802 is of a programmable variety that executes algorithms and/or processes data in accordance with operating logic 808 as defined by programming instructions (such as software or firmware) stored in memory 806. Additionally or alternatively, the operating logic 208 for processing device 802 may be at least partially defined by hardwired logic or other hardware. Further, the processing device 802 may include one or more components of any type suitable to process the signals received from input/output device 804 or from other components or devices and to provide desired output signals. Such components may include digital circuitry, analog circuitry, or a combination thereof.

The memory 806 may be of one or more types of non-transitory computer-readable media, such as a solid-state memory, electromagnetic memory, optical memory, or a combination thereof. Furthermore, the memory 806 may be volatile and/or nonvolatile and, in some embodiments, some or all of the memory 806 may be of a portable variety, such as a disk, tape, memory stick, cartridge, and/or other suitable portable memory. In operation, the memory 206 may store various data and software used during operation of the control system 800 such as operating systems, applications, programs, libraries, and drivers. It should be appreciated that the memory 806 may store data that is manipulated by the operating logic 808 of processing device 802, such as, for example, data representative of signals received from and/or sent to the input/output device 804 in addition to or in lieu of storing programming instructions defining operating logic 808. As shown in FIG. 2, the memory 806 may be included with the processing device 802 and/or coupled to the processing device 802 depending on the particular embodiment. For example, in some embodiments, the processing device 802, the memory 806, and/or other components of the control system 800 may form a portion of a system-on-a-chip (SoC) and be incorporated on a single integrated circuit chip.

Figure 9:
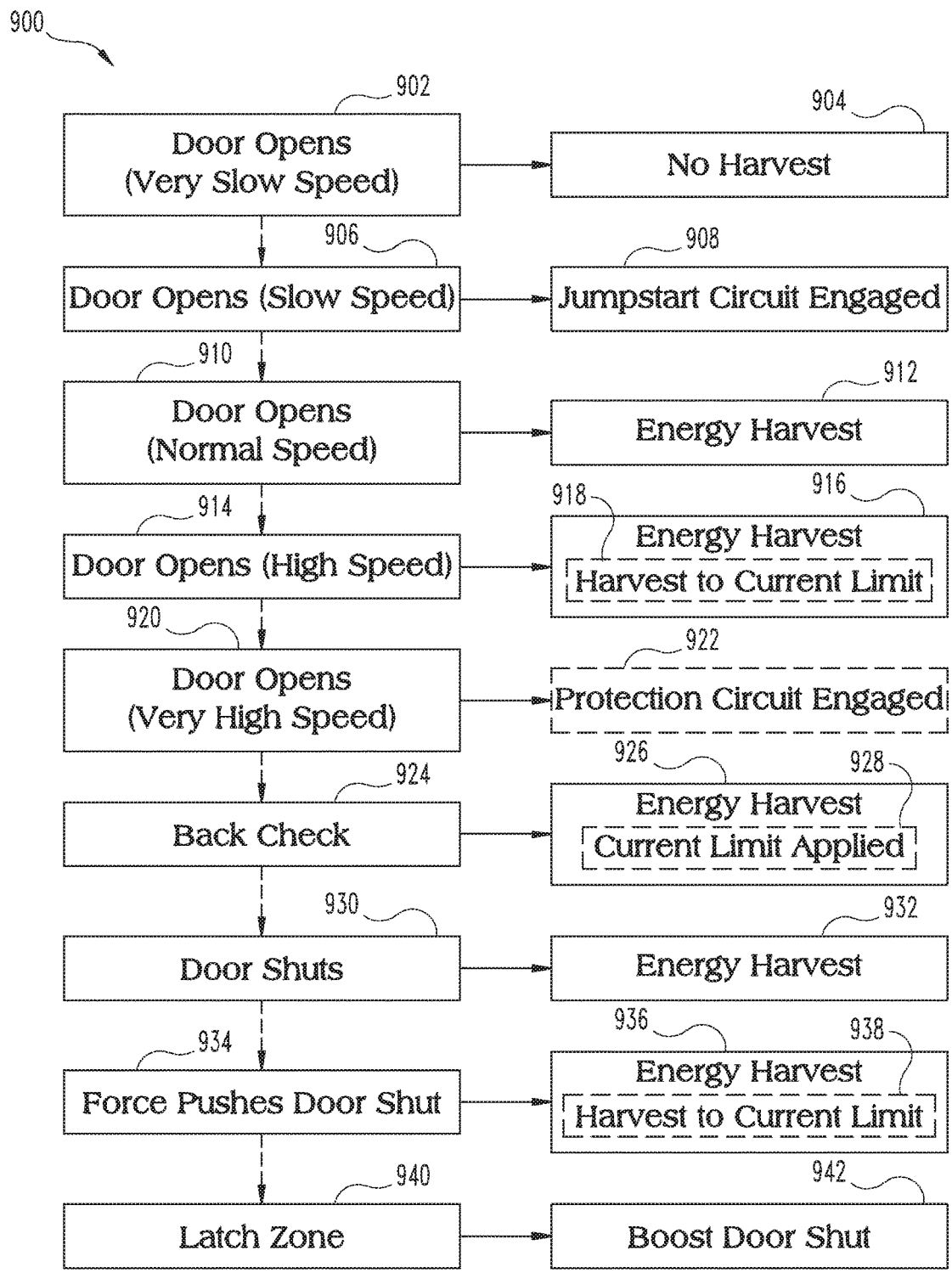
FIG. 9 is a simplified block diagram of an least one embodiment of a method for harvesting energy and providing a power boost using a power boost assembly.

Referring now to FIG. 9, in use, the power boost assembly 104, or more particularly the control system 800, may execute a method 900 for harvesting energy and providing a power boost. It should be appreciated that the particular blocks of the method 900 are illustrated by way of example, and such blocks may be combined or divided, added or removed, and/or reordered in whole or in part depending on the particular embodiment, unless stated to the contrary. As shown, the blocks shown in the left column (blocks 902, 906, 910, 914, 920, 924, 930, 934, 940) indicate what is occurring with the door physically at a given point in time, and the blocks shown in the right column (blocks 904, 908, 912, 916, 918, 922, 926, 928, 932, 936, 938, 942) indicate the core focus of the electronics of the power boost assembly 104 in response to the corresponding physical status of the door.

The illustrative method 900 begins with block 902 in which the door opens very slowly. It should be appreciated that the door may open at various speeds (e.g., very slow speed, slow speed, normal speed, high speed, very high speed). Further, the particular speeds associated with the speed ranges may vary depending on the particular embodiment. If the door is opening very slowly (e.g., less than 1.5 RPM), then in block 904, the power boost assembly 104 may not harvest electrical energy and the electronics may not wake up. If the power boost assembly 104 determines in block 906 that the door is opening slowly (e.g., above 1.5 RPM but still below normal speed), a jumpstart circuit may be used in block 908, which may effectively function as a boost converter that helps generate enough energy to fully turn on the electronics, for example, for harvesting.

If the power boost assembly 104 determines in block 910 that the door is opening at a normal speed, then in block 912, the power boost assembly 104 harvests electrical energy based on the movement of the door. If the power boost assembly 104 determines in block 914 that the door is opening at a high speed, the power boost assembly 104 continues to harvest the electrical energy in block 916. Further, in some embodiments, it should be appreciated that the power boost assembly 104 harvests only up to a current limit in block 918. In embodiments in which the door closer 102 is a hydraulic door closer, the power boost assembly 104 may "back off" on harvesting to let the hydraulics take over. As such, the power boost module 104 electronics and the hydraulics system may work with one another and rely on each other's operation. In some embodiments, it should be appreciated that the motor 106 is designed such that it is physically unable to provide enough torque for the door to move in an unsafe manner, so electronic control over the torque is unnecessary. If the power boost assembly 104 determines in block 920 that the door is opening at a very high speed, a protection circuit is engaged in block 922, for example, to protect the electronics.

In block 924, the door may reach a back check position (e.g., at seventy degrees). If so, at block 926, the power boost assembly 104 continues to harvest extra electrical energy. Further, in block 928, the power boost assembly 104 may apply a current limit similar to block 918 in some embodiments. If the power boost assembly 104 determines that the door is shutting (e.g., via a spring in the door) in block 930, the power boost assembly 104 continues to harvest electrical energy in block 932. If the power boost assembly 104 determines that a force (e.g., wind, a person, etc.) is pushing the door shut, the power boost assembly 104 continues to harvest electrical energy. However, in block 938, in some embodiments, the power boost assembly 104 may harvest only until a current limit is reached. If the power boost assembly 104 determines in block 940 that a latch zone has been reached (e.g., zero to fifteen degrees, a user-adjusted position, etc.), the power door assembly 104 provides a boost force to the motor 106 to boost the door shut in block 942. As indicated above, in some embodiments, the power door assembly 104 may also consider the speed of the door such that a fast-moving door does not receive an additional boost force to boost the door shut.

As described herein, the motor 106 generates electrical energy at certain points in time and provides a boost force (using stored electrical energy) at other points in time. In particular, the motor 106 may be adapted to supply the boost force only when the door is within the latch zone (e.g., between zero and fifteen degrees) and only when the door is moving in a closing direction. Further, the motor 106 may provide the boost force only when the door is moving at a speed below a threshold speed (e.g., too slowly to shut on its own) and/or the electrical energy stored in the energy storage device is sufficient (e.g., estimated to be sufficient) that the boost force is capable of driving the door to a closed position. Depending on the particular embodiment, the motor 106 may be configured to generate electrical energy at any time the door is moving fast enough to harvest energy (e.g., above a threshold speed) or only within a particular range/direction of motion. For example, in some embodiments, the motor 106 may generate electrical energy when the door is moving in an opening direction whereas, in other embodiments, the motor 106 may generate electrical energy regardless of the direction of the door movement. It should be appreciated that the threshold speeds described herein may vary depending on the particular embodiment (e.g., 500 RPM). Similarly, in some embodiments, the motor 106 may generate electrical energy only if the door is outside the latch zone (e.g., between fifteen degrees and ninety degrees). It should be appreciated that the door swing/opening range may vary depending on the particular embodiment. For example, in various embodiments, the door may be capable of opening only to 90 degrees, 120 degrees, 180 degrees, or another suitable maximum door opening angle.

Figure 10:
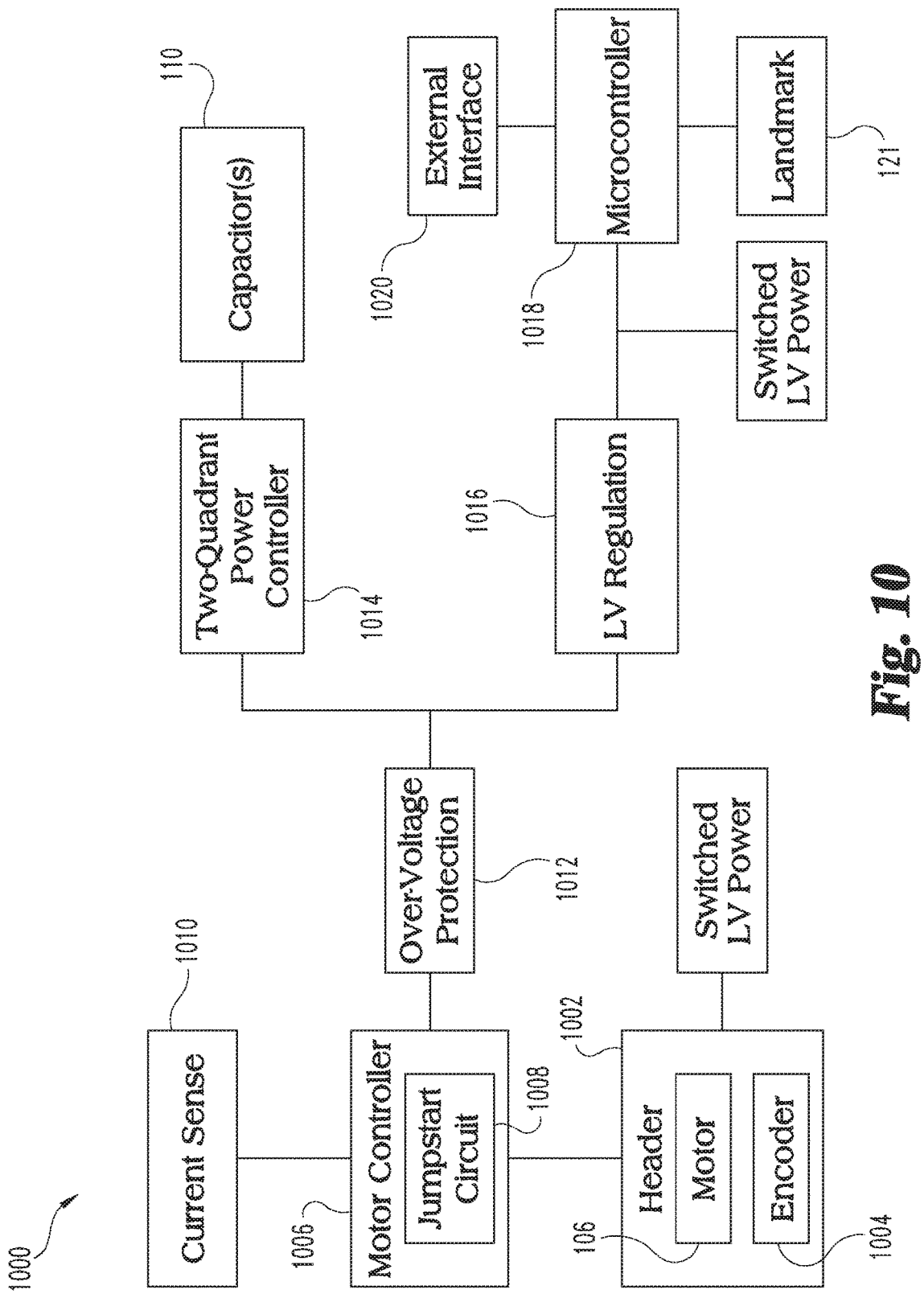
FIG. 10 is a simplified block diagram of at least one embodiment of an architecture of a power boost assembly.

Referring now to FIG. 10, at least one embodiment of an architecture 1000 of the power boost assembly 104 is shown. As shown, the illustrative architecture 1000 includes a header 1002 (including the motor 106 and an encoder 1004), a motor controller 1006 (including the jumpstart circuit 1008), a current sense circuitry 1010, an over-voltage protection circuitry 1012, a two-quadrant power controller 1014, the energy storage device 110, a low-voltage (LV) regulation circuitry 1016, a microcontroller 1018, the landmark sensor 121, and an external interface 1020.

It should be appreciated that the motor encoder 1004 may include an encoder comparator and encoder lines. Further, in some embodiments, the motor 106 and the encoder 1004 may be on a printed circuit board (PCB) separate from the other electronics of the architecture 1000. The illustrative motor controller 1006 receives signals from the motor 106, which are fed into the jumpstart circuit 1008 for power boosting when needed. Additionally, the motor controller 1006 includes an H-bridge and a corresponding driver for the H-bridge. The H-bridge driver and the jumpstart circuit 1008 may communicate with the microcontroller (e.g., the PCBA 112).

In the illustrative embodiment, the current sense circuitry 1010 includes a voltage reference, one or more current sense op-amps, and a current sense. Further, the current sense circuitry 1010 may include or interact with the LV regulation circuitry 1016 and transmit analog outputs the microcontroller. The over-voltage protection circuitry 1012 functions to protect against overly high voltages in the power boost assembly 104. The architecture 1000 includes a high current path from the over-voltage protection circuitry 1012 to the two-quadrant power controller 1014 and a low current path from the over-voltage protection circuitry 1012 to the LV regulation circuitry 1016. The two-quadrant power controller 1014 includes a buck controller, boost controller and drivers and is configured to convert electrical energy into a form usable by the energy storage device 110. The energy storage device 110 circuit may include one or more energy storage devices 110 (e.g., capacitors, supercapacitors, ultracapacitors, etc.), overvoltage protection, enablement/disablement circuitry, and voltage monitoring circuitry and enablement circuitry. Further, the energy storage device 110 circuit may receive instructions from and/or transmit data to the microcontroller. In some embodiments, a set of electrical switches function to prevent leakage in the energy storage device 110.

The LV regulation circuitry 1016 may include a low voltage power supply and a bypass circuit. In some embodiments, the LV regulation circuitry 1016 may be embodied as a 50V to 3.3V power converter. However, the LV regulation circuitry 1016 may include the bypass circuit to, at voltages below 3.3V, allow power to the microcontroller and avoid powering off of the microcontroller that may occur without the bypass circuit. Accordingly, the jumpstart circuitry 1008 may be powered by virtue of power supplied through the bypass to boost the power and jumpstart the microcontroller. In the illustrative embodiment, the jumpstart circuitry 1008 may be configured to receive an input voltage generated by the motor 106 that is unusable to power the microcontroller and boost the input voltage to an activation power useful to power the microcontroller. In other words, the jumpstart circuitry 1008 boosts ultra-low voltages from the motor 106 into usable energy for higher-efficiency motor control systems (e.g., the microcontroller).

As indicated above, in some embodiments, the microcontroller 1018 may be embodied as, or include, the PCBA 112. The external interface 1020 may include mechanisms by which a user or technician may access the microcontroller 1018 (e.g., for reprogramming, updates, set). As such, the external interface 1020 may include, for example, user interface switches (e.g., potentiometers, lever switches, buttons, etc.), user interface LEDs or other output devices, and/or a programming header.

It should be appreciated that the architecture 1000 may include additional, or alternative, components in other embodiments. Further, in some embodiments, one or more of the components described in reference to the architecture 1000 may be omitted in some embodiments.

Figure 11A:
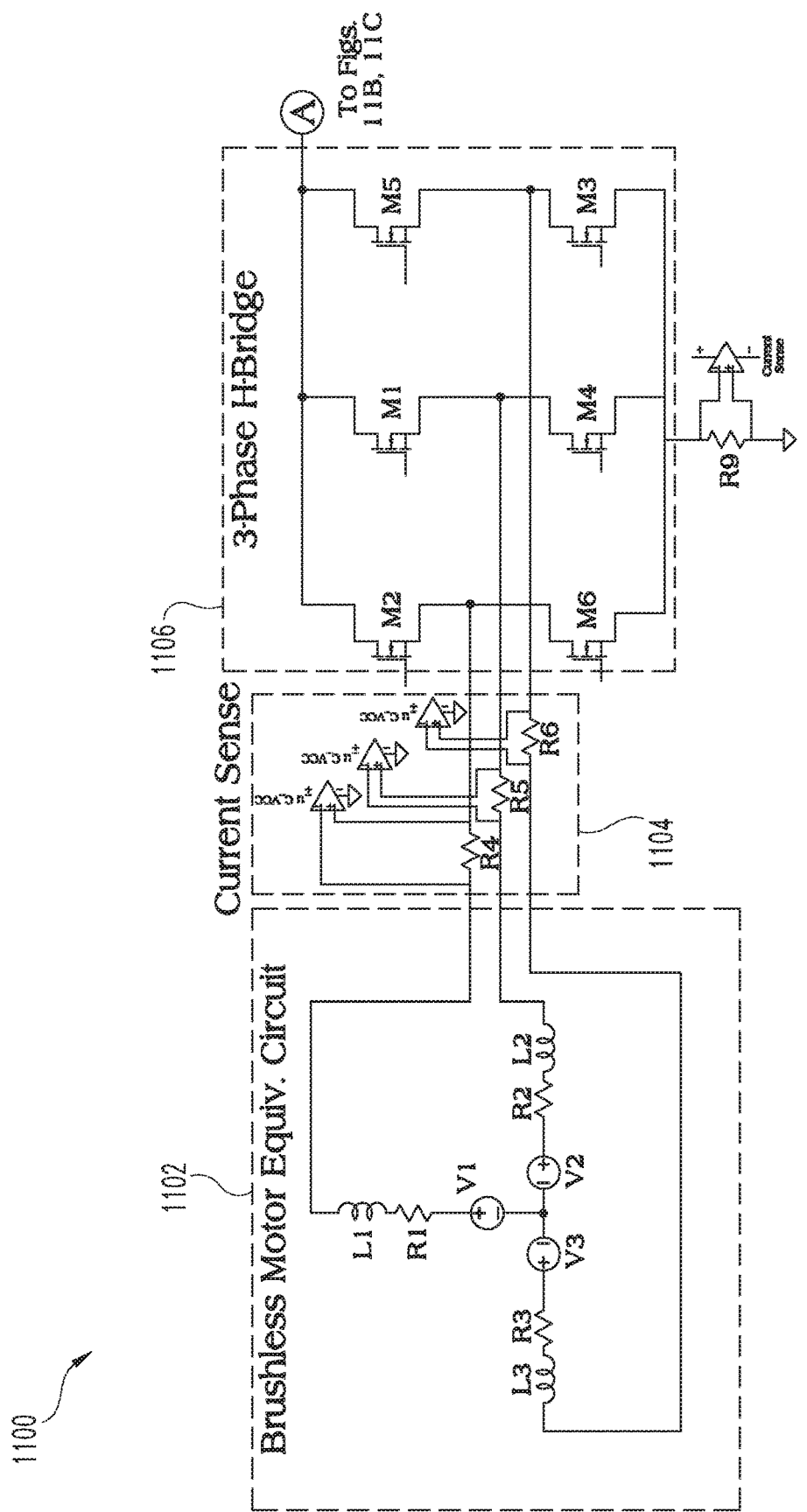
FIGS. 11A-11C are simplified schematics of at least one embodiment of an electrical circuit of a power boost assembly including a brushless motor.
Figure 11B:
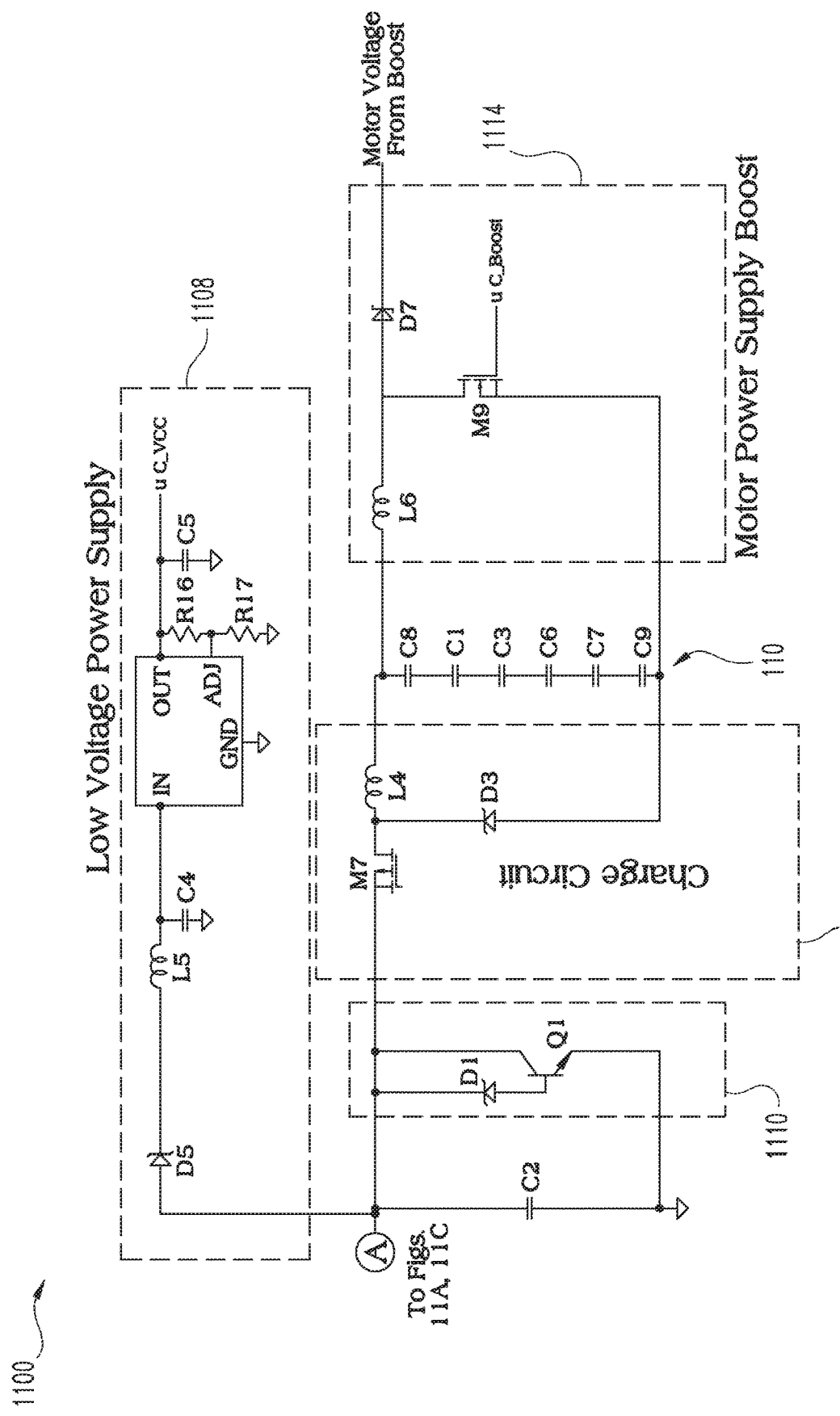
Figure 11C:
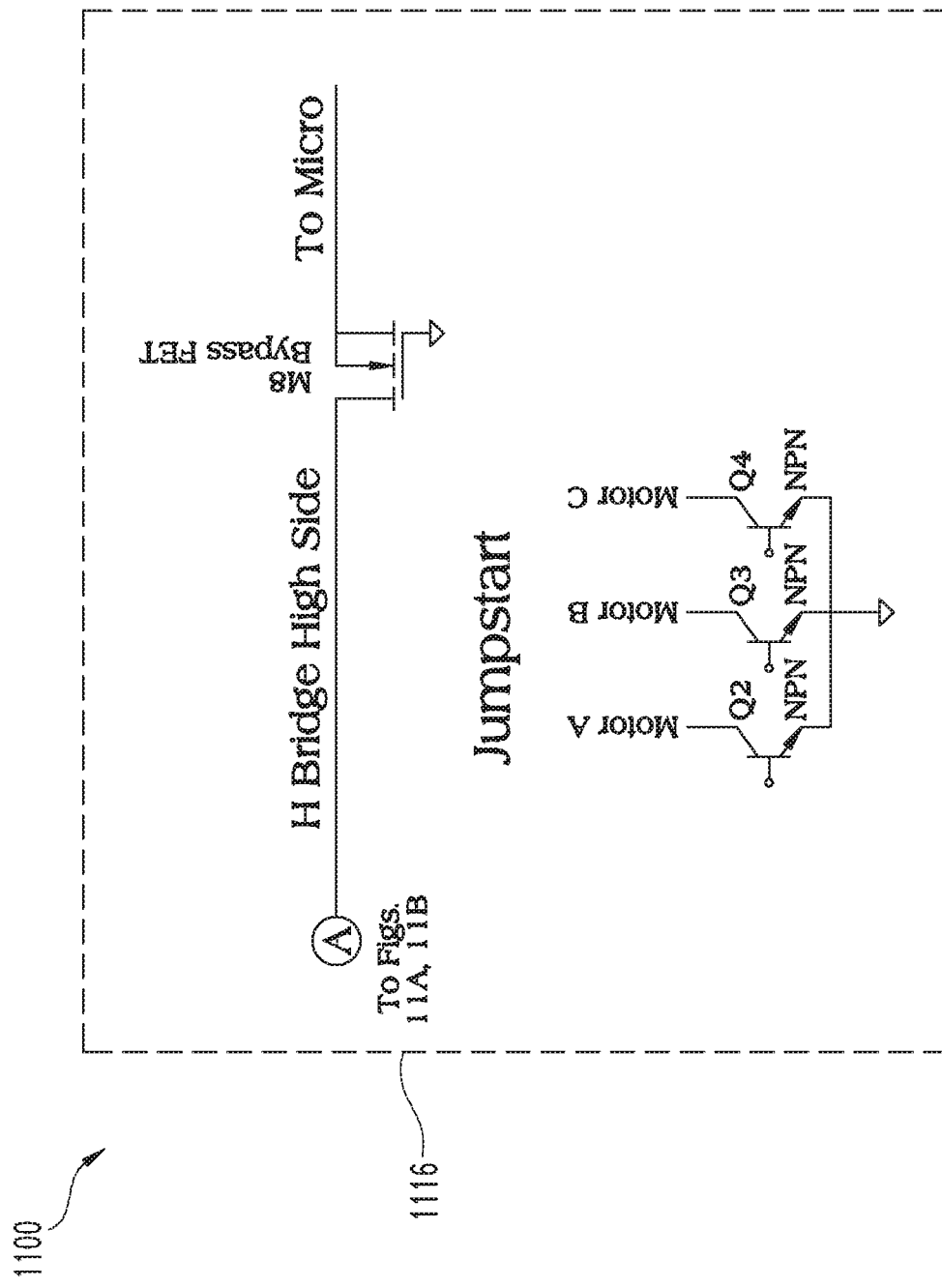

Referring now to FIGS. 11A-C, at least one embodiment of an electrical circuit 1100 of the power boost assembly 104 is shown. It should be appreciated that the electrical circuit 1100 corresponds with embodiments of the power boost assembly 104 in which the motor 106 is a DC brushless motor. As shown, the electrical circuit 1100 includes a brushless motor 1102 (or, more specifically, a brushless motor equivalent circuit), a current sense circuitry 1104, a three-phase H-bridge 1106, a low voltage power supply 1108, a high power over-voltage protection circuitry 1110, a charge circuitry 1112, the energy storage device 110, the motor power supply boost circuitry 1114, and the jumpstart circuitry 1116. It should be appreciated that these components may perform functions similar to the similarly named components described above.

In some embodiments, the electrical circuit 1100 may use motor winding losses as the inductor for a boost converter, which may in turn be utilized to harvest energy from the motor 106. In other words, the motor H-bridge 1106 may be treated as a boost converter. In operation, the microcontroller may pulse the low side FETs of the H-bridge 1106, and the inductive "kick back" may go through the high side to charge the system. Further, one of the low side FETs may be pulsed to determine the amount of torque applied to the door (along with door speed) and provide braking independent of the energy harvesting.

In some embodiments, the charge circuitry 1112 is adapted to supply the harvested energy to the energy storage device 110 (e.g., a bank of supercapacitors), and the motor power supply boost circuitry 1114 is adapted to provide the power boost to the motor 106 in response to a command received from the microcontroller (e.g., a switching signal received by the FET of the circuitry 1114). Further, it should be appreciated that, in some embodiments, the jumpstart circuitry 1116 may be replaced with a boost converter electrically wired to the low voltage power supply 1108.

Figure 12A:
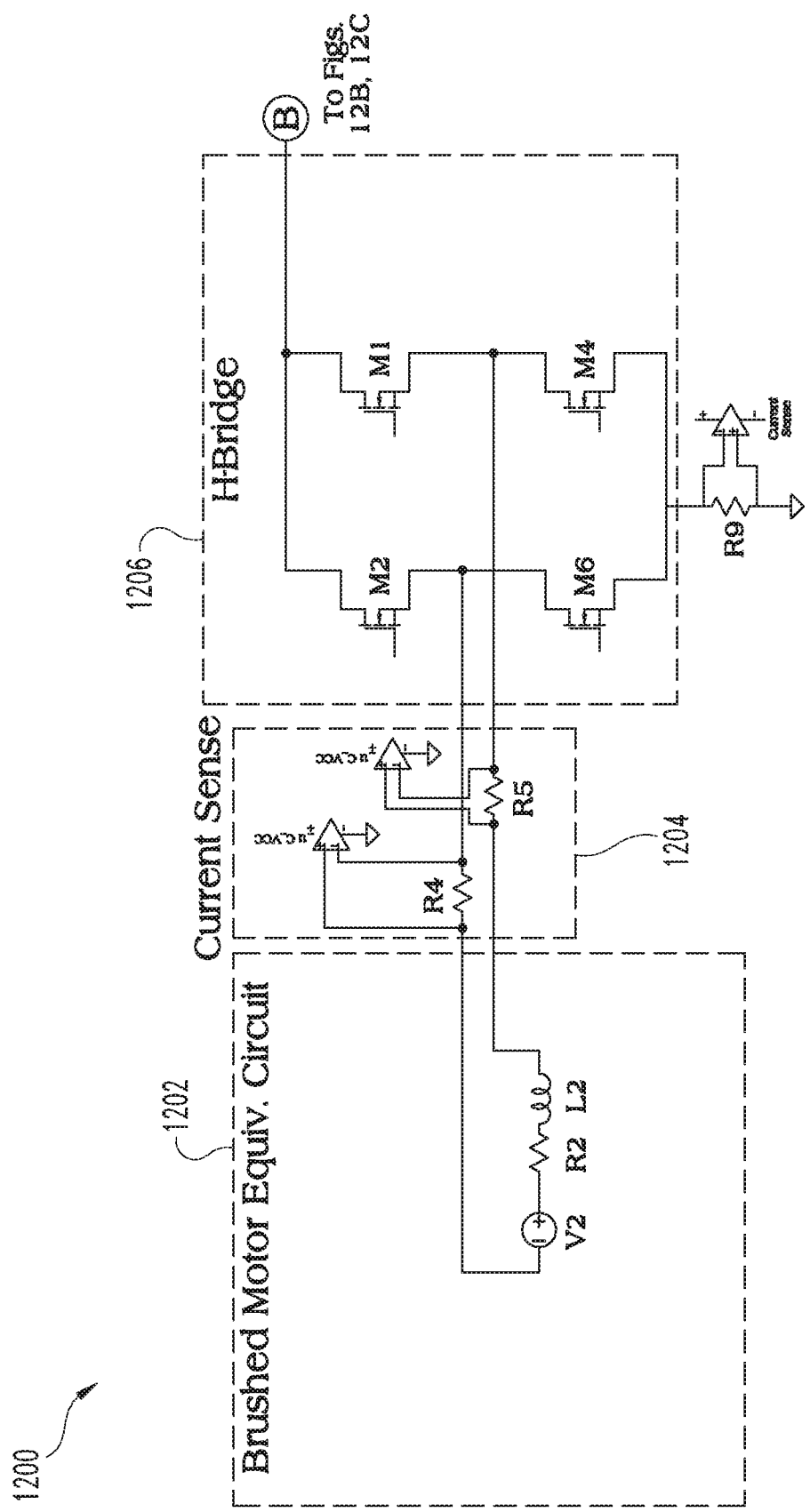
FIGS. 12A-12C are simplified schematics of at least one other embodiment of an electrical circuit of a power boost assembly including a brushed motor.
Figure 12B:
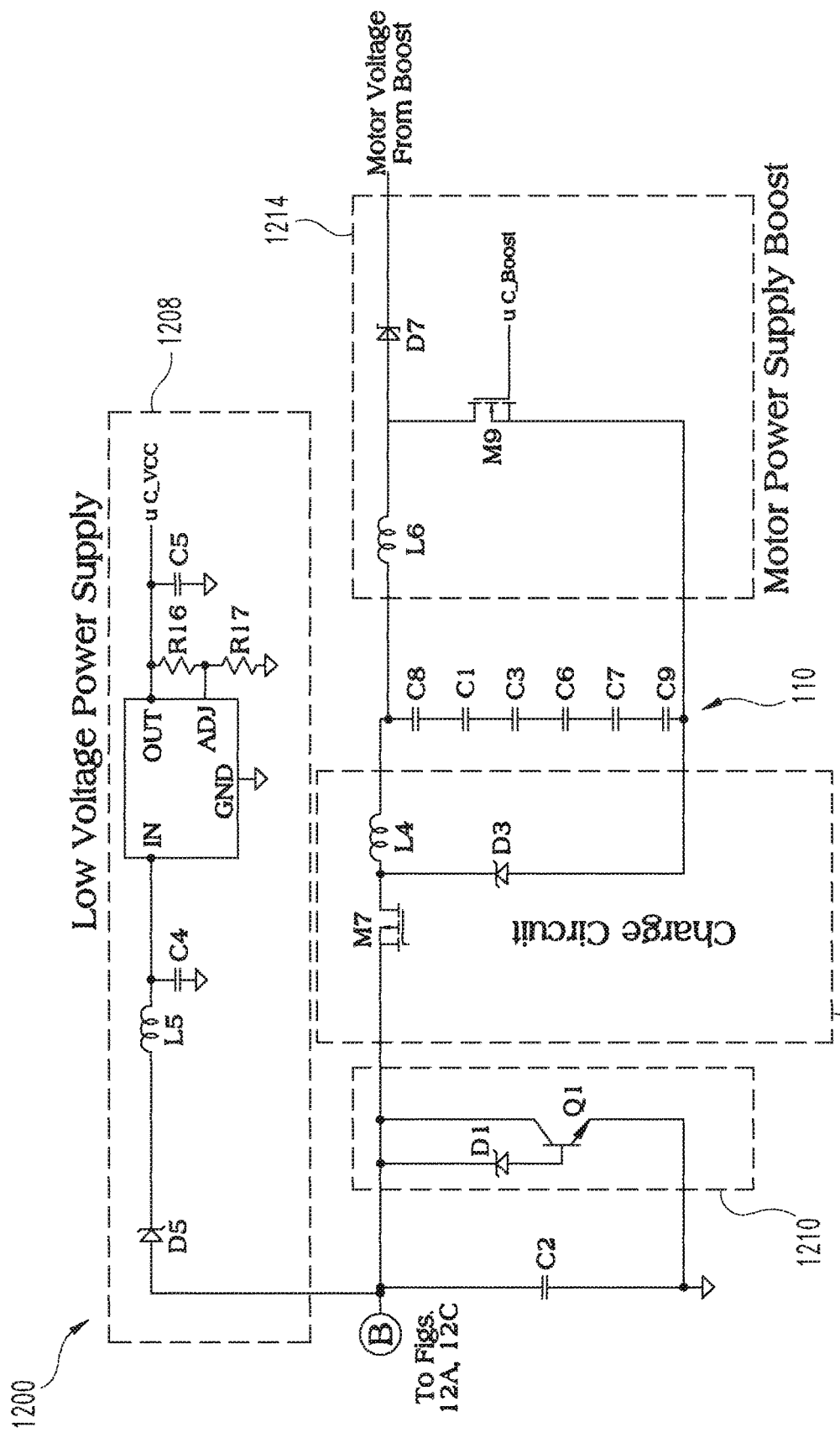
Figure 12C:
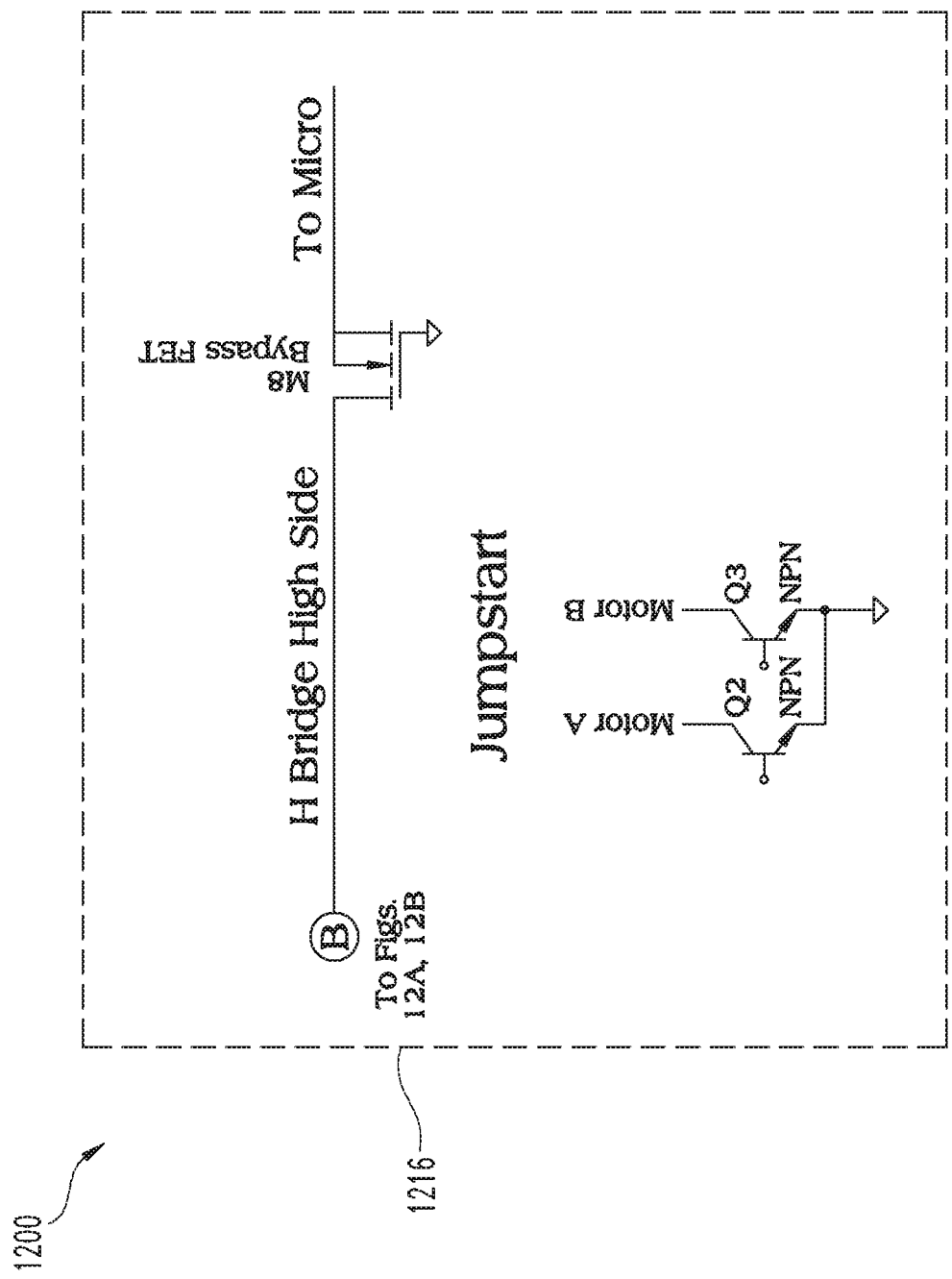

Referring now to FIGS. 12A-C, at least one other embodiment of an electrical circuit 1200 of the power boost assembly 104 is shown. It should be appreciated that the electrical circuit 1200 is similar to the electrical circuit 1100 of FIGS. 11A-C. However, unlike the electrical circuit 1100, the electrical circuit 1200 corresponds with embodiments of the power boost assembly 104 in which the motor 106 is a brushed motor. As shown, the electrical circuit 1200 includes a brushed motor 1202 (or, more specifically, a brushed motor equivalent circuit), a current sense circuitry 1204, an H-bridge 1206, a low voltage power supply 1208, a high power over-voltage protection circuitry 1210, a charge circuitry 1212, the energy storage device 110, the motor power supply boost circuitry 1214, and the jumpstart circuitry 1216. It should be appreciated that these components may perform functions similar to the similarly named components described above.

As described herein, the motor power supply boost circuitry 1214 may function essentially as a boost converter. When the microcontroller intends to drive the motor 106 with a power boost, the microcontroller may turn off M12 of the charge circuitry 1212 and turn on M13 of the motor power supply boost circuitry 1213 (and use pulse width modulation), which may create a stable rail that can be supplied to the motor to drive the door shut.

Figure 13:
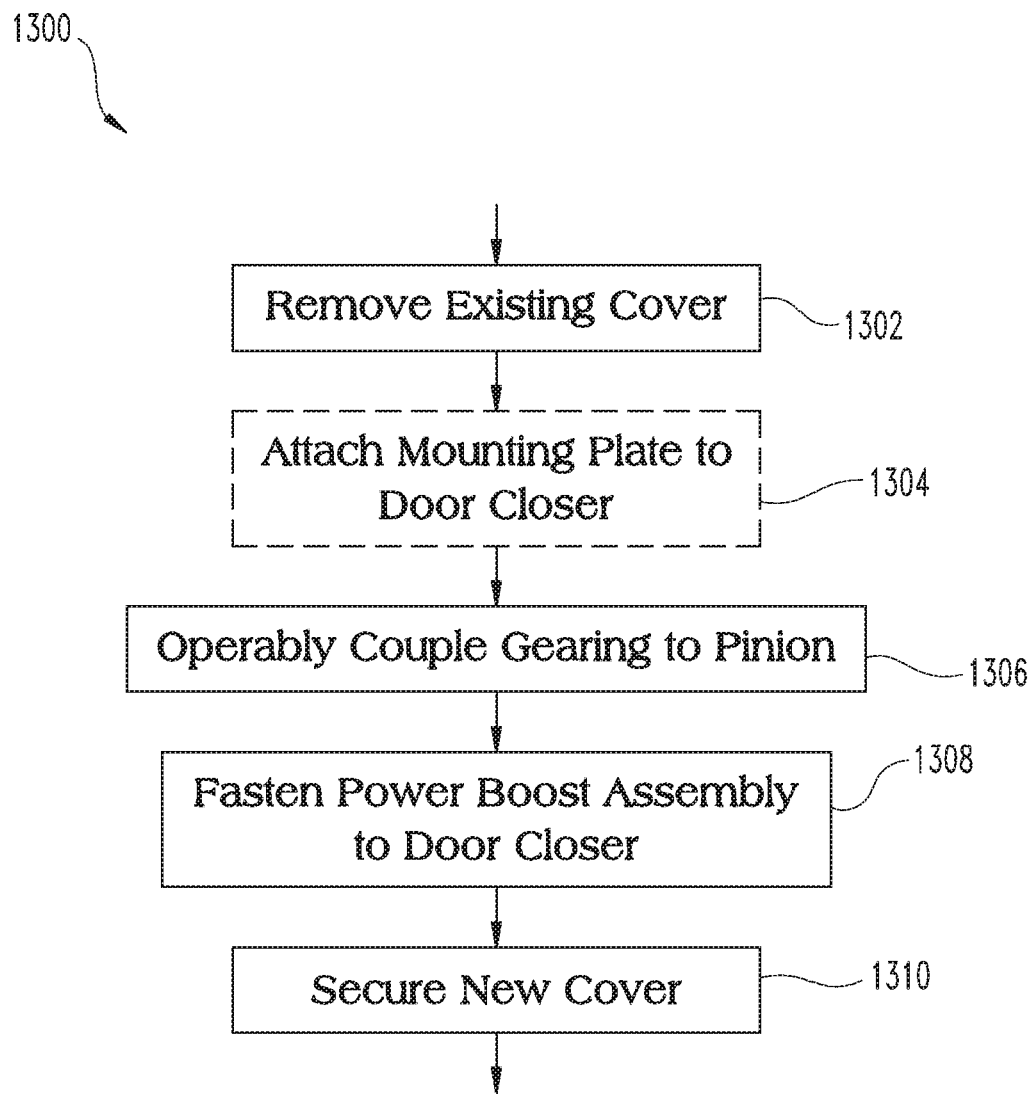
FIG. 13 is a simplified block diagram of at least one embodiment of a method for retrofitting a door closer with a power boost assembly.

Referring now to FIG. 13, at least one embodiment of a method 1300 for retrofitting a door closer 102 with a power boost assembly 104 is shown. As described above, it should be appreciated that a door closer 102 may be assembled to a particular door in the field without a power boost assembly 104 or similar features thereof. Rather, the door closer 102 may simply be secured to the door 122 and door frame 124 and housed within a cover large enough to secure the door closer 102. In such circumstances, it may be beneficial to retrofit the door closer system 100 with a power boost assembly 104 to provide the benefits of assisting the door in closing described herein. In doing so, a technician may retrofit the door closer system 100 while the door closer 102 stays attached to the door 122.

As such, the illustrative method 1300 begins with block 1302 in which the technician may remove an existing cover from the existing door closer 102. Of course, it should be appreciated that the door closer 102 need not include a cover in some embodiments. In block 1304, in some embodiments, the technician may attach a mounting plate to the door closer 102 as described above. In such embodiments, the mounting plate must include an aperture or other feature by which the power boost assembly 104 may be operably connected to the pinion 103 of the door closer 102.

In block 1306, the technician operably couples the gearing 108 of the power boost converter 104 with the pinion 103 of the door closer 102. In particular, the pinion 103 may be inserted into a bore 109 defined within a particular gear of the gearing 108, as described above. It should be appreciated that the operable connection is such that rotation of the pinion 103 resulting from movement of the door 122 causes a corresponding rotation of the gear of the gearing 108.

In block 1308, the technician may fasten the power boost assembly 104, or more particularly the housing 105 of the power boost assembly 104, to the door closer 102. For example, in some embodiments, the technician may use the fasteners 107 to secure the two components to one another as described above. In other embodiments, the power boost assembly 104 and the door closer 102 may be secured to one another via another suitable mechanism. In yet other embodiments, the power boost assembly 104 and the door closer 102 need not be secured to one another (other than the pinion 103 and gearing 108 connection). Instead, in such embodiments, the power boost assembly 104 and/or the door closer 102 may be secured in place, for example, to the door 122 or a mounting plate secured to the door 122.

In block 1310, the technician may secure a new cover 120 (e.g., a different/larger cover) to the door closer system 100 that now includes both the door closer 102 and the power boost assembly 104. As discussed above, in some embodiments, the cover 120 may be fastened to the door closer 102 using the same fastening mechanism used to fasten the previous cover used to house only the door closer 102. In other embodiments, the technician need not secure a cover to house the door closer 102 and/or the power boost assembly 104.

Figure 14:
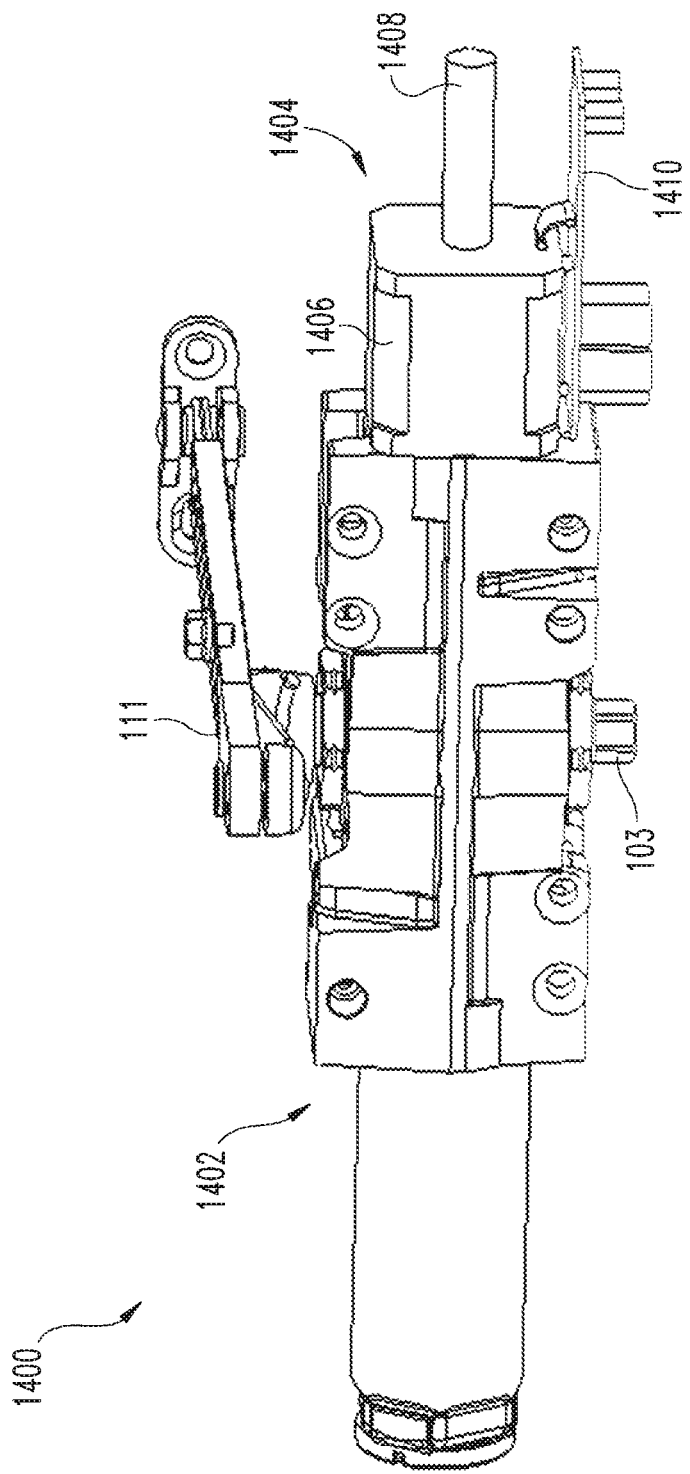
FIG. 14 is a front perspective view of at least one other embodiment of a door closer system.
Figure 15:
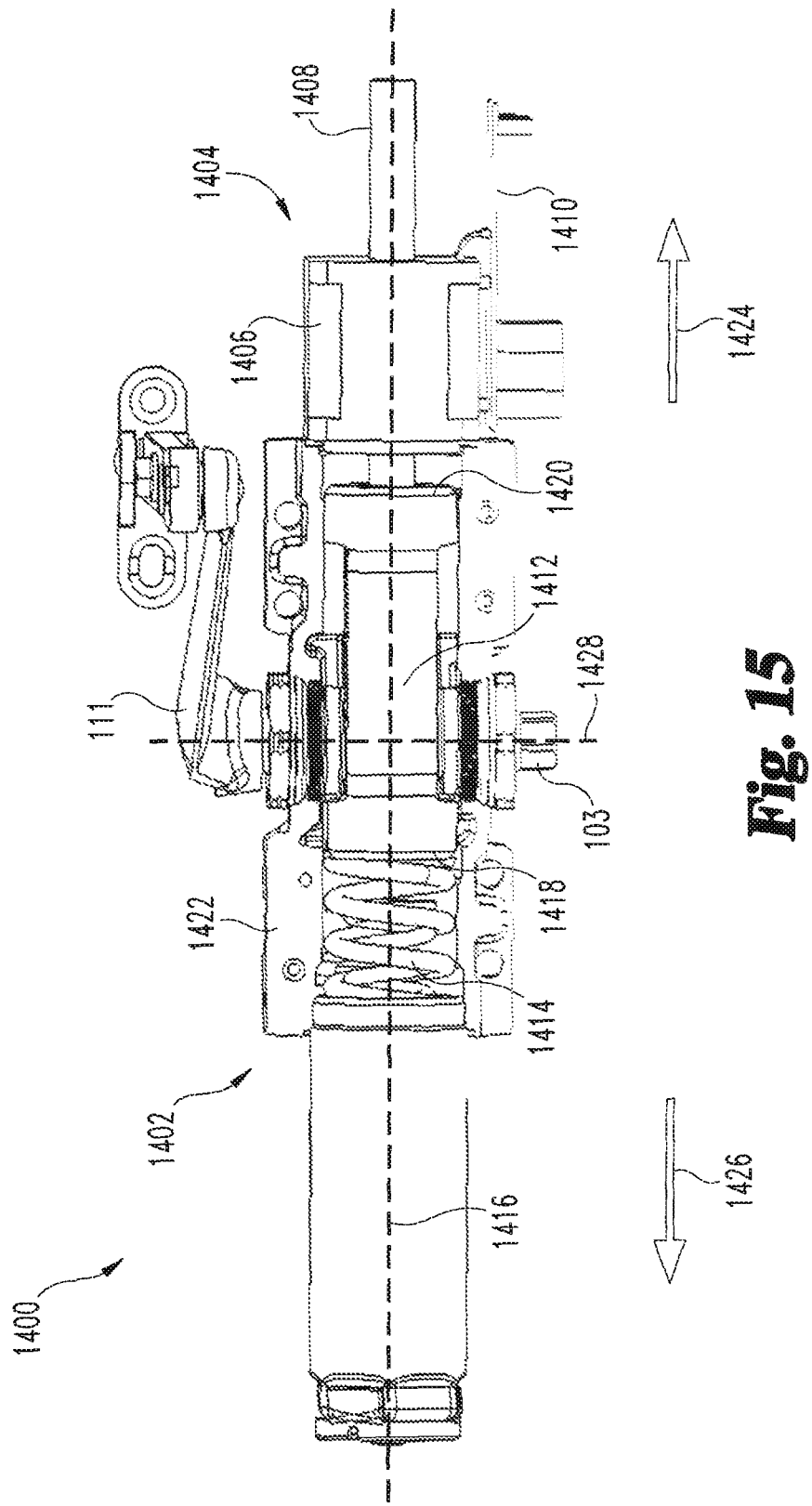
FIG. 15 is a front, cutaway view of the door closer system of FIG. 14 when the door is closed.
Figure 16:
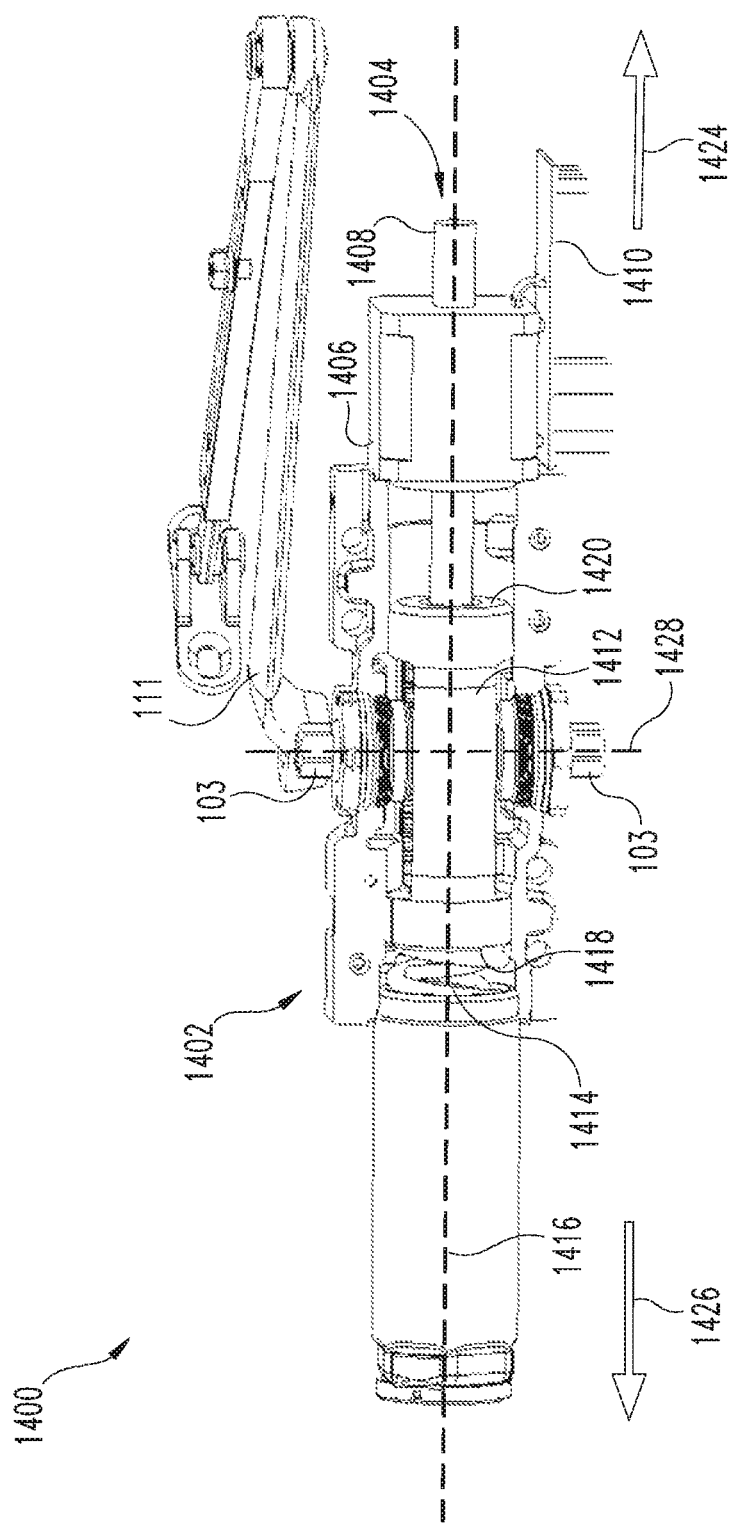
FIG. 16 is a front, cutaway view of the door closer system of FIG. 14 when the door is opened.

Referring now to FIGS. 14-16, illustrated therein is at least one other embodiment of a door closer system 1400. The door closer system 1400 is structured and configured to harvest energy (e.g., by generating and storing the energy) via a person pushing on the door and/or via the closing force generated by a door closer, and subsequently using that harvested energy to boost the door shut (i.e., terminal shutting of the door). It should be appreciated that the door closer system 1400 may include one or more of the components or features of the door closer systems described above. Therefore, the description of such components/features is not described herein in detail for brevity and clarity.

FIGS. 14-16 show various views of the door closer system 1400 and/or the components/devices thereof. In particular, FIG. 14 illustrates a front view of the door closer system 1400, and FIGS. 15-16 show cutaway views of the door closer system 1400 when the door is closed (FIG. 15) and when the door is opened (FIG. 16). As shown, the door closer system 1400 includes a door closer 1402 and a power boost assembly 1404.

In the illustrative embodiment, the door closer 1402 is embodied as a hydraulic door closer. However, it should be appreciated that the door closer 1402 may be embodied as another suitable type of closer in other embodiments. As shown in FIGS. 15-16, the door closer 1402 includes a pinion 103, a piston 1412, and a spring 1414 that contacts and applies a force (when compressed) to the piston 1412 at an end 1418 of the piston 1412. The illustrative piston 1412 and the spring 1414 are positioned within a housing 1422 of the door closer 1402 along a longitudinal axis 1416 defined by the door closer 1402. The longitudinal axis 1416 defines a fist direction 1424 and a second direction 1426. It should be appreciated that the closer arm 111 is operably coupled to the pinion 103 and the pinion 103 is operably coupled to the piston 1412 (either directly or indirectly) such that movement of the closer arm 111 drives rotational movement of the pinion 103 about an axis 1428, which in turn drives movement of the piston 1412 along the longitudinal axis 1416. In particular, when the door is moving in an opening direction, the piston 1412 is driven in the second direction 1426. However, when the door is moving in a closing direction, the piston 1412 is driven in the first direction 1424. Further, movement of the piston 1412 in the second direction 1426 compresses the spring 1414, which applies a force to the piston 1412 in the first direction 1424, thereby assisting with the closing of the door.

The power boost assembly 1404 includes a motor 1406, a lead screw 1408, and a PCBA 1410. In the illustrative embodiment, the motor 1402 is embodied as a lead screw stepper motor. However, it should be appreciated that, in other embodiments, the motor 1402 may be embodied as any type of motor capable of performing the techniques described herein. In particular, the motor 1402 may be embodied as a type of motor with a motor-gear-screw drive type arrangement that provides linear motion and is capable of being attached to an end of the door closer 1402. The lead screw 1408 is attached to an end 1420 of the piston 1412 opposite the end 1418 that contacts the spring 1414 such that the lead screw 1408 extends from the end 1420 along the longitudinal axis 1416. In the illustrative embodiment, the motor 1406 is operably connected to the lead screw 1408 via a suitable driving mechanism. For example, in some embodiments, the motor 1406 and the lead screw 1408 may operably connect to one another via a rack and pinion mechanism. In other embodiments, the motor 1406 and the lead screw 1408 may be operably connected via another suitable mechanism that permits the motor 1406 to apply, directly or indirectly, a driving force to the lead screw 1408 in the first direction 1424 and allows the motor 1406 to be back driven to harvest electrical energy.

The PCBA 1410 may be configured similar to the PCBA 112 of the door closer system 100. As such, the PCBA 1410 may include the hardware, firmware, and/or software (e.g., logic) for operating the power boost assembly 1404. For example, the PCBA 1410 may include a processing device (e.g., one or more microprocessors and/or microcontrollers) or electronic circuitry (e.g., analog and/or digital). Further, in some embodiments, the PCBA 1410 may include a user interface that permits the user to adjust one or more settings of the power boost assembly 1404. It should be appreciated that the power boost assembly 1404, or more particularly the PCBA 1410, may use any suitable technique for determining, for example, whether the door is in a boost region (e.g., the latch region) and/or other determinations described above in reference to the door closer system 100.

In operation, as the door is opened, the linear movement of the piston 1412 in the second direction 1426 back drives the motor 1406, which allows the harvesting of electrical energy according to principles similar to those described above. As the door closes, the motor 1402 is back driven in the opposite direction, which also allows electrical energy to be harvested. When the boost region or latch region is region is reached, the motor 1406 may be driven to pull the piston 1412 in the closing direction (i.e., in the first direction 1424), thereby supplying a power boost or boost force to the piston 1412. As indicated above, the PCBA 1410 may analyze various data to determine when to harvest energy and/or when to supply electrical energy to the motor 1406 to provide a boost force. For example, in some embodiments, the motor 1406 only provides a boost force if the current closing speed of the door is insufficient to result in terminal closing of the door.

What is claimed is:

1. A system for storing and/or generating electrical energy generated by a motor associated with a door closer, comprising:
 a door closer operably coupled to a door and having a pinion configured to rotate in a first direction in response to an opening of the door and to rotate in a second direction, opposite the first direction, in response to a closing of the door;
 the motor configured to generate a motor voltage that is triggered by a rotational movement of the pinion in response to the opening and/or the closing of the door and to supply a boost force to the pinion to assist the closing of the door;
 a gearing operably coupled to the pinion and the motor and configured to back drive the motor to generate the motor voltage in response to the rotational movement of the pinion;
 an energy storage device configured to (i) store electrical energy that is harvested from the motor that is triggered by the rotational movement of the pinion and (ii) supply the stored electrical energy to the motor to generate the boost force supplied to the pinion; and
 a controller configured to:
  monitor the motor voltage as the electrical energy is harvested from the motor in response to the rotational movement of the pinion;
  dynamically adjust the boost force supplied to the pinion based on the motor voltage generated from the motor as the electrical energy is harvested when the motor voltage is indicative that a door speed of the door as the door is closing is below a door speed threshold thereby indicating that the rotational movement of the pinion requires the boost force to assist the closing of the door; and
  dynamically store the electrical energy that is harvested from the motor based on the motor voltage when the motor voltage is indicative that the rotational movement of the pinion does not require the boost force to assist the closing of the door.

2. The apparatus of claim 1, wherein the motor is adapted to generate the electrical energy over a first range of motion of the door; and
 wherein the motor is adapted to supply the boost force over a second range of motion of the door.

3. The apparatus of claim 2, wherein the power boost module comprises a landmark sensor that includes an antenna and a target board secured to and for rotation with a rotor of the motor, the target board including a landmark point that is sensed by the antenna; and
 wherein the second range is determined by the landmark sensor.

4. The apparatus of claim 3, wherein the second range is associated with the door being opened between zero and fifteen degrees; and
 wherein the motor is adapted to supply the boost force over the second range only when the door is moving in a closing direction.

5. The apparatus of claim 1, wherein the motor is adapted to supply the boost force only when the electrical energy stored in the energy storage device is sufficient that the boost force is capable of driving the door to a closed position.

6. The apparatus of claim 1, further comprising an electronic circuitry configured to control the supply of electrical energy generated by the motor to the energy storage device and the supply of electrical energy stored in the energy storage device to the motor for the boost force.

7. The apparatus of claim 1, wherein the motor is adapted to operate as a brake to slow movement of the door while the motor generates the electrical energy.

8. The apparatus of claim 1, further comprising a mounting plate;
 wherein the power boost module comprises a gearbox adapted to house the gearing; and
 wherein the mounting plate is mounted to the door closer between the door closer and the gearbox.

9. The apparatus of claim 1, wherein the energy storage device comprises a capacitor.

10. The apparatus of claim 1, wherein the power boost module is structured to be modularly attached to a door-mounted door closer.

11. The apparatus of claim 1, further comprising a cover structured to conceal the door closer and the power boost module.

12. A power boost module attachable to a door closer for supplying a boost force to assist in closing a door, the power boost module comprising:
 a motor configured to generate a motor voltage that is triggered by a rotational movement of a pinion of the door closer and to supply a boost force to the pinion to assist the closing of the door;
 a gearing operably coupled to the pinion and the motor, the gearing structured to back drive the motor to generate the motor voltage in response to rotation of the pinion;
 an energy storage device adapted to (i) store the electrical energy that is harvested by the motor that is triggered by the rotational movement of the pinion and (ii) supply the stored electrical energy to the motor to generate the boost force that is supplied to the pinion; and
 a controller configured to:

monitor the motor voltage as the electrical energy is harvested from the motor in response to the rotational movement of the pinion;

dynamically adjust the boost force supplied to the pinion based on the motor voltage generated from the motor as the electrical energy is harvested when the motor voltage is indicative that a door speed of the door as the door is closing is below a door speed threshold thereby indicating that the rotational movement of the pinion requires the boost force to assist the closing of the door; and dynamically store the electrical energy that is harvested from the motor when the motor voltage is indicative that the rotational movement of the pinion does not require the boost force to assist the closing of the door.

13. The power boost module of claim 12, wherein the motor is adapted to generate the electrical energy over a first range of motion of the door; and wherein the motor is adapted to supply the boost force over a second range of motion of the door only when the door is moving in a closing direction.

14. The power boost module of claim 13, wherein the second range is associated with the door being opened between zero and fifteen degrees;

wherein the first range is associated with the door being opened between fifteen degrees and a maximum door opening angle; and wherein the motor is adapted to generate the electrical energy over the first range when the door is moving in either an opening direction or the closing direction.

15. The power boost module of claim 14, wherein the motor is adapted to generate the electrical energy over the first range when the door is moving in the opening direction.

16. The power boost module of claim 13, wherein the motor is adapted to supply the boost force over the second range of motion only when the door is moving in a closing direction at a speed below a threshold speed; and wherein the motor is adapted to generate electrical energy over the first range of motion when the door is moving in the closing direction at a speed above the threshold speed.

17. The power boost module of claim 12, wherein the motor is embodied as a direct current (DC) brushless motor.

* * * * *